(12) United States Patent
Sreedhara et al.

(10) Patent No.: US 11,861,564 B2
(45) Date of Patent: Jan. 2, 2024

(54) SYSTEMS AND METHODS FOR DELAYING THE START TIME OF AN EVENT BASED ON EVENT ATTENDEE ARRIVAL TIMES

(71) Applicant: Rovi Guides, Inc., San Jose, CA (US)

(72) Inventors: Arun Sreedhara, Karnataka (IN); Charles Dawes, Tyne and Wear (GB); Gyanveer Singh, Vaishali (IN)

(73) Assignee: Rovi Guildes, Inc., San Jose, CA (US)

( * ) Notice: Subject to any disclaimer, the term of this patent is extended or adjusted under 35 U.S.C. 154(b) by 109 days.

(21) Appl. No.: 17/118,949

(22) Filed: Dec. 11, 2020

(65) Prior Publication Data

US 2021/0248564 A1  Aug. 12, 2021

Related U.S. Application Data

(63) Continuation of application No. 15/623,871, filed on Jun. 15, 2017, now Pat. No. 10,909,505.

(51) Int. Cl.
*H04N 21/258* (2011.01)
*G06Q 10/1093* (2023.01)
*G06F 17/18* (2006.01)
*G06F 16/29* (2019.01)

(52) U.S. Cl.
CPC ......... *G06Q 10/1095* (2013.01); *G06F 16/29* (2019.01); *G06F 17/18* (2013.01); *H04N 21/25841* (2013.01)

(58) Field of Classification Search
None
See application file for complete search history.

(56) References Cited

U.S. PATENT DOCUMENTS

| | | | |
|---|---|---|---|
| 5,715,400 A * | 2/1998 | Reimer | H04N 21/4722 348/E7.071 |
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,367,217 B2 * | 6/2016 | Moore, Jr. | G06Q 10/02 |
| 9,552,560 B1 * | 1/2017 | Tomkins | G06Q 50/01 |
| 10,194,204 B1 | 1/2019 | Don et al. | |
| 10,299,189 B2 * | 5/2019 | Scarborough | G06Q 10/02 |
| 10,319,376 B2 | 6/2019 | Erhart et al. | |
| 10,607,193 B1 * | 3/2020 | Wender | H04W 4/029 |
| 2002/0174430 A1 | 11/2002 | Ellis et al. | |

(Continued)

*Primary Examiner* — Folashade Anderson
(74) *Attorney, Agent, or Firm* — HALEY GUILIANO LLP

(57) ABSTRACT

Systems and methods are provided herein for altering a start time of an event based on indicia of how late event attendees will be for the event that are retrieved from location applications corresponding to each attendee of the attendees. For example, a media guidance application may determine a start time of an event, a location of the event, and attendees of the event. The media guidance application may determine location applications corresponding to the attendees. The media guidance application may query the location applications for arrival times of each attendee. The media guidance application may calculate a plurality of differences between each of the arrival times and the start time of the event. Based on the plurality of differences, the media guidance application may delay the start time of the event.

11 Claims, 9 Drawing Sheets

(56) References Cited

U.S. PATENT DOCUMENTS

| | | | |
|---|---|---|---|
| 2005/0172154 A1* | 8/2005 | Short | H04M 3/42017 726/5 |
| 2005/0251827 A1 | 11/2005 | Ellis et al. | |
| 2007/0264969 A1 | 11/2007 | Frank et al. | |
| 2008/0109317 A1* | 5/2008 | Singh | G06Q 30/0254 705/14.5 |
| 2008/0167937 A1* | 7/2008 | Coughlin | G06Q 10/1093 705/7.19 |
| 2008/0270220 A1* | 10/2008 | Ramer | G06F 16/68 707/E17.121 |
| 2009/0299857 A1* | 12/2009 | Brubaker | G06Q 30/02 455/99 |
| 2010/0153885 A1 | 6/2010 | Yates | |
| 2010/0211425 A1 | 8/2010 | Govindarajan | |
| 2011/0066468 A1 | 3/2011 | Huang et al. | |
| 2011/0252097 A1 | 10/2011 | Walker et al. | |
| 2011/0289142 A1* | 11/2011 | Whalin | G06Q 30/02 709/203 |
| 2012/0230651 A1* | 9/2012 | Chen | H04N 5/782 386/292 |
| 2013/0096813 A1 | 4/2013 | Geffner et al. | |
| 2013/0148164 A1* | 6/2013 | Kakizaki | G06F 3/1204 358/1.15 |
| 2014/0188616 A1* | 7/2014 | Badenhop | G06Q 30/0267 705/14.58 |
| 2014/0229099 A1 | 8/2014 | Garrett et al. | |
| 2015/0050950 A1 | 2/2015 | Alon et al. | |
| 2015/0317657 A1* | 11/2015 | Boudville | G06Q 30/0275 705/14.71 |
| 2016/0014564 A1* | 1/2016 | Del Vecchio | H04W 4/023 455/456.2 |
| 2016/0119438 A1* | 4/2016 | Abramson | H04N 21/25841 709/217 |
| 2016/0148126 A1* | 5/2016 | Paleja | G06Q 30/0269 705/5 |
| 2016/0148164 A1 | 5/2016 | Luk et al. | |
| 2017/0178193 A1* | 6/2017 | Jagannath | G06Q 30/04 |
| 2017/0238064 A1 | 8/2017 | Hathaway et al. | |
| 2017/0300869 A1* | 10/2017 | Johnson | G06F 16/2343 |
| 2018/0322431 A1* | 11/2018 | Folck | G01S 19/51 |
| 2019/0334907 A1 | 10/2019 | Rodden et al. | |
| 2021/0042724 A1* | 2/2021 | Rathod | G07G 1/0054 |

\* cited by examiner

1000

1002 — Determine a Start Time of an Event, a Location of the Event, and a Plurality of Attendees of the Event

1004 — Determine a Plurality of Location Applications, Wherein Each Attendee of the Plurality of Attendees Corresponds to a Respective Location Application of the Plurality of Location Applications

1006 — Query the Plurality of Location Applications for a Plurality of Arrival Times, Each Arrival Time of the Plurality of Arrival Times Corresponding to a Respective Attendee of the Plurality of Attendees

1008 — Calculate a Plurality of Differences Between Each of the Plurality of Arrival Times and the Start Time of the Event

1010 — Delay, Based on the Plurality of Differences, the Start Time of the Event

FIG. 10

SYSTEMS AND METHODS FOR DELAYING THE START TIME OF AN EVENT BASED ON EVENT ATTENDEE ARRIVAL TIMES

CROSS-REFERENCE TO RELATED APPLICATION

This application is a continuation of U.S. patent application Ser. No. 15/623,871, filed Jun. 15, 2017, which is hereby incorporated by reference herein its entirety.

BACKGROUND

Event attendees often are late and miss start times of events. Traditionally, if attendees are late for an event, they miss attending a beginning portion of the event. Some systems allow attendees to view this portion of the event on a user device, but it may be cumbersome for the attendee to access a viewing of the event on their user device. Furthermore, viewing the event on a user device does not offer the same experience as viewing the event with other attendees at the location of the event.

SUMMARY

Systems and methods are provided herein for altering a start time of an event based on indicia, retrieved from location applications corresponding to each attendee of the event attendees, of how late event attendees will be for the event. By altering the start time of the event based on how late attendees will be, more attendees will be able to experience the entire event. Moreover, by retrieving indicia of how late the attendees will be from location applications associated with the attendees, the start time of the event is altered with little disruption to the attendees.

The systems and methods described herein may be implemented by a media guidance application. In some aspects of the disclosure, the media guidance application retrieves a data structure from an event information database associated with an event. For example, the media guidance application may access an event information database hosted by a movie theater company, such as the movie theater company AMC Theaters, or from a third-party database that aggregates event information. The media guidance application may retrieve a data structure from this event information database. The data structure may contain a start time of the event, a location of the event, and a plurality of attendee identifiers corresponding to a plurality of attendees of the event. For example, from the data structure, the media guidance application may determine that the event is a showing of a movie called "Guardians of the Galaxy" at 7:00 PM EST at AMC Theater 19 located at 175 Tremont Street Boston, Mass. The data structure may contain a plurality of attendee identifiers corresponding to a plurality of attendees of the event, such as a list of names of people who have bought tickets to see "Guardians of the Galaxy" at 7:00 PM EST at AMC Theater 19. For example, UserA, UserB, UserC, UserD, and UserE may have bought tickets online for the movie showing.

In some embodiments, the media guidance application may determine, using the plurality of attendee identifiers, a plurality of location applications, wherein each attendee of the plurality of attendees corresponds to a respective location application of the plurality of location applications. For example, the media guidance application may search a location application database using the list of names of people who have bought tickets to the movie showing. The media guidance application may determine, for example, that UserA corresponds to location application GPS_A, while UserB corresponds to GPS_B.

In some embodiments, the media guidance application may query the plurality of location applications for a plurality of arrival times, each arrival time of the plurality of arrival times corresponding to a respective attendee of the plurality of attendees. For example, the media guidance application may query GPS_A for an arrival time for UserA at AMC Theater 19. GPS_A may return, to the media guidance application, an arrival time of 7:25 PM for UserA.

In some embodiments, the media guidance application may further query the plurality of location applications to determine address information for a plurality of devices running the plurality of location applications, wherein each of the plurality of devices corresponds to a respective one of the plurality of attendees. For example, the media guidance application may contact the location application GPS_A associated with UserA and ask for address information (e.g., an IP address that could be used to communicate with a device) for the device (e.g., a mobile device, DeviceA) associated with GPS_A.

After the media guidance application has determined the plurality of arrival times, in some embodiments, the media guidance application may calculate a plurality of differences between the plurality of arrival times and the start time of the event. For example, UserA may have an arrival time of 7:25 PM but the start time of the event may be 7:00 PM. In this case, a difference (associated with UserA) of the plurality of differences would be 25 minutes.

In some embodiments, the media guidance application may calculate a statistical representation of the plurality of differences. For example, the media guidance application may calculate the average of the plurality of the differences. For example, if the plurality of differences was 25 minutes, 15 minutes, 5 minutes, 10 minutes, and 20 minutes, the statistical representation may be 15 minutes.

In some embodiments, the media guidance may remove some differences from the plurality of differences when calculating the statistical representation. For example, the media guidance application may remove, from the plurality of difference, a difference corresponding to an attendee who is often late to events.

In some embodiments, to determine which attendees are often late to events, the media guidance application may determine a plurality of user profiles, wherein a user profile of the plurality of user profiles corresponds to an attendee of the plurality of attendees. The media guidance application may determine, based on the user profile, an event history of the attendee, wherein the event history comprises an indicator of punctuality. For example, the media guidance application may access a user profile database and determine a user profile for UserB. The user profile for UserB may comprise an event history data structure, containing event history information for UserB. The event history data structure may contain an indicator of punctuality for UserB, such as a percentage representing how many events UserB has arrived at "on time" out of the past events UserB has attended. For example, UserB may have attended 29 past events and been late to 23 of them. UserB's indicator in this case would be 6/29 or approximately 21 percent, which means UserB was on time to only 21 percent of the events he or she attended.

In some embodiments, the media guidance application may compare the indicator of punctuality to a punctuality threshold. For example, the punctuality threshold may be 50 percent. The media guidance application may compare UserB's 21 percent indicator of punctuality to the 50 percent punctuality threshold and determine that UserB falls below the punctuality threshold.

In some embodiments, the media guidance application may, in response to determining the event history of the attendee, remove, based on comparing the indicator of punctuality to the punctuality threshold, a difference of the plurality of differences from the plurality of differences, wherein the difference corresponds to the attendee. For example, the difference corresponding to UserB may be removed from the plurality of differences because UserB's 21 percent indicator of punctuality falls below the 50 percent punctuality threshold. The statistical representation may then be recalculated, using the plurality of differences, wherein the difference corresponding to UserB is no longer included in the plurality of differences.

In some embodiments, the statistical representation may be a weighted average. The media guidance application may determine an importance weight of a plurality of importance weights corresponding to an attendee of the plurality of attendees, wherein the plurality of importance weights sums to one. For example, some attendees may be more important to the event than others. The importance of the attendees can be stored as importance weights that represent a fraction of 1. For example, if there are five attendees, the attendees may be weighted equally, with 0.2 assigned to each attendee as their importance weight. If, however, the event were a birthday party, the person whose birthday the party is celebrating, UserE for example, would be a more important attendee than any of the other attendees. In this case, UserE may have an importance weight of 0.6, while the four other attendees may have each have a 0.1 importance weight. The importance weights may, for example, be set by the host of the event or determined by the media guidance application based on the attendee role in the event.

The media guidance application may identify a difference of the plurality of differences corresponding to the attendee. For example, UserE may have an importance weight of 0.6 and an arrival time of 7:20 PM, and may therefore correspond to a difference of 20 minutes. In some embodiments, the media guidance application may multiply the difference by the importance weight to determine a weighted difference of a plurality of weighted differences. For example, the weighted difference of UserE may be 0.6 multiplied by 20, which results in a weighted difference of 12 minutes.

In some embodiments, the media guidance application may compute, using the plurality of weighted differences, a weighted average of the plurality of differences and assign the weighted average to be the statistical representation. For example if the weights for UserA, UserB, UserC, UserD, and UserE were 0.1, 0.1, 0.1, 0.1, and 0.6, respectively, and the differences for these attendees were 25, 15, 5, 10, and 20 minutes, respectively, the weighted differences would be 2.5, 1.5, 0.5, 1.0, and 12 minutes, respectively. To compute the weighted average of the plurality of differences, the media guidance application may simply sum the plurality of weighted differences, to result in a weighted average of the plurality of differences equal to 17.5 minutes. The media guidance application may then assign 17.5 minutes as the statistical representation.

In some embodiments, the media guidance application may compare the statistical representation to a threshold. For example, the threshold may be set by the host of the event, such as AMC Theaters, and may represent an acceptable amount of time of the event for an attendee to miss. AMC Theaters may set, for example, a threshold of 5 minutes. The media guidance application may compare the 5 minutes threshold to a 15-minute statistical representation (representing the average amount that the attendees are late).

In some embodiments, the media guidance application may determine, based on the comparing, whether the statistical representation exceeds the threshold. For example, if the statistical representation is 15 minutes and the threshold is 5 minutes, the media guidance application may determine that the statistical representation is greater than the threshold. In some embodiments, the media guidance application may, in response to determining that the statistical representation exceeds the threshold, delay the start time of the event by an amount that is based on the statistical representation of the plurality of differences. For example, if the statistical representation is 15 minutes and the threshold is 5 minutes, the media guidance application may delay the start time of the event by 15 minutes. For example, the movie showing of "Guardians of the Galaxy" at AMC Theater 19 may then have a start time of 7:15 PM rather than 7:00 PM. If, for example, the statistical representation was only 3 minutes and therefore less than the 5-minute threshold, the event would not be delayed. By comparing the statistical representation to the threshold, the systems and methods described herein guarantee that the event is not delayed for insignificant attendee delays.

If the event start time is delayed, in some embodiments, the media guidance application may transmit a notification to each of the plurality of devices comprising an indication of the delayed start time of the event. For example, the media guidance application may contact DeviceA at the address information (e.g., IP address) associated with DeviceA, which is associated with UserA. The media guidance application may transmit to DeviceA, for example, a notification that says "The start time of 'Guardians of the Galaxy' is delayed to 7:15 PM".

In some embodiments, the notification comprises a selectable option relating to the delayed start time, wherein the selectable option comprises a first option and a second option, the first option being negative and the second option being positive. For example, the notification may include two attendee-clickable options, one that says "yes" and one that says "no". UserA may, for example, click "no" to indicate that he or she does not approve of the delayed start time of 7:15 PM.

In some embodiments, the selectable option may allow an attendee to indicate whether he or she is willing to pay to delay the start time of the event. For example, by selecting (e.g., by clicking) the second (positive) option, the attendee may indicate that he or she is willing to pay a fee to delay the start time of the event. In some examples, selecting the second option may prompt the attendee to input payment information, use payment information that has already been stored in a user profile associated with the attendee to automatically charge the attendee, or any other suitable payment option. By selecting (e.g., by clicking) the first (negative) option, the attendee may indicate that he or she is not willing to pay to delay the start time of the event.

In some embodiments, the media guidance application may determine, using the data structure retrieved from the event information database, a group of attendees of the plurality of attendees, each of whom indicated, when indicating he or she would attend the event, acceptance of a delayed start time of the event. For example, an attendee may purchase a ticket to event 122 before the start time of the event. At the time of purchase of the ticket, the attendee may indicate his or her acceptance of a possible delay to the start time of the event. This information may be stored in the data structure in the event information database. The media guidance application may retrieve the information from the data structure to determine whether an attendee accepts or rejects the delayed start time of the event.

In some embodiments, the media guidance application may determine, based on user profiles associated with the plurality of attendees, a default response to the selectable option. The default response may, for example, correspond to the first (negative) option or the second (positive) option. For example, an attendee may set up his or her user profile to reflect that he or she will always accept a delayed start time. In this example, the media guidance application may determine, based on the user profile, the attendee is associated with the second (positive) response to the selectable option and determine that this reflects a positive response to the selectable option. In some embodiments, because the media guidance application determined a default answer corresponding to the attendee, the media guidance application may transmit for display the notification comprising the delayed start time of the event without displaying the selectable option to the attendee.

In some embodiments, the media guidance application may receive a plurality of responses, wherein each response of the plurality of responses corresponds to the selectable option. For example, if there are 80 attendees of the movie showing, the media guidance application may receive 80 responses from the 80 attendees. Each attendee response of the plurality of attendee responses may indicate whether the respective attendee approves of the delayed start time of the event.

In some embodiments, the media guidance application may determine a plurality of negative responses of the plurality of responses and a plurality of positive responses of the plurality of responses. For example, the media guidance application may determine whether each response was "yes" or "no". The media guidance application may sum the plurality of negative responses, sum the plurality of positive responses, and compare the summed plurality of negative responses to the summed plurality of positive responses. For example, the media guidance application may have notified 80 attendees of the delayed start time and received 60 responses. Of the 60 responses, the media guidance application may sum the positive "yes" responses to determine 23 attendees accepted the delayed start time. The media guidance application may then sum the negative "no" responses to determine 37 attendees rejected the delayed start time. The media guidance application may compare the summed plurality of positive responses to the summed plurality of negative responses to determine that more attendees rejected the delayed start time than accepted it.

In some embodiments, the media guidance application may recalculate, based on comparing the summed plurality of negative responses to the summed plurality of positive responses, the delayed start time. For example, if more attendees rejected the delayed start time than accepted the delayed start time (i.e., the summed plurality of negative responses was greater than the summed plurality of positive responses), the delayed start time might be adjusted to an earlier (less delayed time). For example, the delayed start time may be 7:15 PM but the recalculated start time may be 7:10 PM.

In some embodiments, the media guidance application may determine, based on delaying the start time of the event, an end time of the event. For example, the media guidance application may determine from the data structure retrieved from the event information database that the movie showing of "Guardians of the Galaxy" lasts two hours. In this example, if the movie showing's delayed start time is 7:15 PM, the media guidance application may determine the end time of the event to be 9:15 PM.

In some embodiments, the media guidance application may retrieve, from a calendar database, calendar information for the plurality of attendees. For example, the media guidance application may retrieve calendar information for UserA. This calendar information for UserA may contain the start time of the next event that UserA will be attending. For example, UserA may have an event scheduled to begin at 9:00 PM.

In some embodiments, the media guidance application may compare the calendar information to the end time. For example, the media guidance application may compare UserA's next event that begins at 9:00 PM to the movie showing end time of 9:15 PM.

In some embodiments, the media guidance application may determine, for each attendee of the plurality of attendees, based on comparing the calendar information to the end time, whether a conflict exists between the end time and the calendar information. For example, the media guidance application may determine that a conflict exists for UserA because the start time of UserA's next event is before the end time of the delayed movie showing.

In some embodiments, the media guidance application may generate for display, to each attendee of the plurality of attendees for whom a conflict is determined to exist, an indication that a conflict has been formed. For example, the media guidance application may generate a notification for display on UserA's mobile device that informs UserA that there is a conflict (e.g., by generating a text message that says "The delayed start time of 'Guardians of the Galaxy' has resulted in an event conflict." to display on UserA's mobile device).

In some embodiments, the media guidance application may determine a conflict event corresponding to a respective conflict of the conflicts existing between the end time and the calendar information, wherein the conflict event is associated with an attendee of the plurality of attendees. For example, the media guidance application may determine that UserA's next event is an event called Birthday Party scheduled to begin at 9:00 PM at 24 Beacon St Boston, Mass.

In some embodiments, the media guidance application may retrieve a data structure associated with the conflict event, wherein the data structure comprises an identifier of a person who is scheduled to attend the conflict event. For example, the media guidance application may access a Birthday Party event information database and retrieve a data structure containing a list of Birthday Party attendees. For example, the data structure may contain information that the Birthday Party is to celebrate Joe's birthday and may contain an identifier indicating Joe is attending the event.

In some embodiments, the media guidance application may alert the person who is scheduled to attend the conflict event that, based on the delayed start time, there is a schedule conflict associated with the conflict event. For example, the media guidance application may transmit a notification to Joe that there is a schedule conflict with the Birthday Party event for UserA.

In some embodiments, the media guidance application may implement an algorithm to determine an event start time that causes the least inconvenience for event attendees. In some embodiments, the media guidance application may determine a latest arrival time of the plurality of arrival times. For example, the latest arrival time of the plurality of arrival times may be 7:25 PM. The media guidance application may determine that this is the latest arrival time by, for example, comparing each arrival time to each of the plurality of arrival times, storing a latest arrival time variable, and updating the latest arrival time variable if a new latest arrival time is found while comparing the arrival times.

In some embodiments, the media guidance application may retrieve from the event information database a second data structure. The second data structure may contain information such as a start time of a next event held at the location of the event. For example, the media guidance application may determine the movie "Edge of Tomorrow" is playing directly after the movie "Guardians of the Galaxy" in AMC Theater 19 Room 12. The media guidance application may recalculate the delayed start time of the event based on the start time of the next event held in the same location as the location of the event. For example, if "Guardians of the Galaxy" has an end time of 9:15 PM, while "Edge of Tomorrow" has a start time of 9:05 PM, the media guidance application may recalculate the delayed start time of "Guardians of the Galaxy" to ensure that the end time of "Guardians of the Galaxy" is before the start time of "Edge of Tomorrow." For example, to remove the time conflict between the showings in AMC Theater 19 Room 12 of "Guardians of the Galaxy" and "Edge of Tomorrow," the recalculated delayed start time of "Guardians of the Galaxy" may be 7:02 PM and the end time corresponding to the recalculated delayed start time may be 9:02 PM, which is before the start time of "Edge of Tomorrow."

In some embodiments, the media guidance application may determine a new event location near the location of the event, wherein the new event location is available at the start time of the next event held in the same location as the location of the event. In some embodiments, rather than recalculating the delayed start time of the event, the media guidance application may assign the new event location to the next event held at the location of the event. For example, the media guidance application may determine the movie "Edge of Tomorrow" is playing directly after the movie "Guardians of the Galaxy" in AMC Theater 19 Room 12. The media guidance application may determine that AMC Theater 19 Room 13 is near the location of the event (AMC Theater 12) and is available at the start time of the movie showing of "Edge of Tomorrow." For example, if "Guardians of the Galaxy" has an end time of 9:15 PM (due to the delayed start time of the event), while "Edge of Tomorrow" has a start time of 9:05 PM, the media guidance application may assign the movie showing of "Edge of Tomorrow" to AMC Theater 19 Room 13, rather than AMC Theater 19 Room 12.

In some embodiments, the media guidance application may determine a plurality of candidate delayed start times between the start time and the latest arrival time. For example, the media guidance application may determine the start time of the movie showing event is 7:00 PM, while the latest arrival time is 7:25 PM. Candidate delayed start times may include, for example, 7:05 PM, 7:10 PM, 7:15 PM, and 7:20 PM.

In some embodiments, the media guidance application may calculate, for each candidate delayed start time of the plurality of delayed start times, a corresponding candidate delayed end time. For example, the media guidance application may determine, from the data structure retrieved from the event information database, that the movie showing of "Guardians of the Galaxy" lasts two hours. Candidate delayed end times may then be calculated by adding the event time to the candidate delayed start times. For example, candidate delayed end times may include 9:05 PM, 9:10 PM, 9:15 PM, and 9:20 PM.

In some embodiments, the media guidance application may use the retrieved calendar information for each of the plurality of attendees to determine, by comparing the calendar information to each candidate delayed end time, a number of attendees of the plurality of attendees who would have a calendar conflict with a corresponding candidate delayed end time for each candidate delayed start time. For example, by delaying the start of the movie showing to 7:20 PM, the end time of the movie showing would be 9:20 PM. If the movie showing ends at 9:20 pm this may cause calendar conflicts for 17 attendees. By delaying the start time of the movie to 7:15 PM, the end time of the movie showing would be 9:15 PM. A movie showing end time of 9:15 PM may cause calendar conflicts for only 7 attendees.

In some embodiments, the media guidance application may assign the start time as the candidate delayed start time corresponding to a candidate delayed end time corresponding to a lowest number of attendees of the plurality of attendees who would have a calendar conflict with the corresponding candidate delayed end time. For example, a start time of 7:15 PM (and corresponding delayed end time of 9:15 PM) may cause calendar conflicts for 7 attendees. Out of all of the candidate start times and corresponding end times, 7:15 PM could be the start time that causes the least inconvenience to the most attendees because the other candidate start times resulted in calendar conflicts for more than 7 attendees. In this case, the media guidance application would assign the start time of the movie showing to be 7:15 PM.

In some embodiments, the media guidance application may transmit media assets to user devices associated with the attendees to decrease the frustration associated with missing an event or delaying the start time of an event. In some embodiments, the media guidance application may access a location database containing a plurality of device identifiers corresponding to a plurality of device locations. For example, the media guidance application may access a global positioning system (GPS) database that contains device identifiers for every device near a certain location.

In some embodiments, the media guidance application may retrieve, from the location database, a plurality of device identifiers corresponding to a plurality of devices at the location of the event, wherein the plurality of devices corresponds to a plurality of device owners. For example, the media guidance application may access the GPS database and retrieve a list of user devices that are currently at the event location, such as AMC Theater 19, where "Guardians of the Galaxy" was scheduled to start at 7:00 PM. For example, UserC may have arrived at AMC Theater 19 before the delayed start time of 7:15 PM. UserC may be bored while waiting for the movie showing to begin and may wish to view a media asset related to "Guardians of the Galaxy."

In some embodiments, the media guidance application may retrieve, from the event information database, a media asset related to the event. For example, if the event is a movie showing of "Guardians of the Galaxy," the media guidance application may retrieve the movie trailer for "Guardians of the Galaxy" from the event information database.

In some embodiments, the media guidance application may prompt each device owner of the plurality of device owners to accept the media asset. For example, the media guidance application may display a notification on the user devices (e.g., mobile devices) at the event that says "Would you like to view the movie trailer for "Guardians of the Galaxy?"" and provides "yes" and "no" options that the users can click to indicate their acceptance ("yes") or rejection ("no") of the movie trailer. For example, UserC may view a notification displayed on his or her phone and select either "yes" to view the movie trailer or "no" to not watch the movie trailer.

The media guidance application may, in response to a device owner of the plurality of device owners accepting the media asset, transmit the media asset to a device corresponding to the device owner of the plurality of devices. For example, if UserC clicks the "yes" option, the "Guardians of the Galaxy" movie may be transmitted to UserC's mobile device, where UserC may then view the movie trailer.

In some embodiments, the media guidance application may provide the plurality of device owners with an incentive to accept the delayed start time of the event. For example, the media guidance application may transmit to the plurality of device owners (e.g., attendees who have arrived at the location of the event before the delayed start time of the event) a reward or incentive to accept (e.g., via the selectable option described above) the delayed start time of the event. For example, the media guidance application may transmit to the plurality of device owners, based on whether they respond positively to the selectable option, a free or reduced cost version of the movie (e.g., "Guardians of the Galaxy") they plan to view at the event location (e.g., AMC Theater 19), when the movie is released to the general public on demand. This incentive rewards the early attendees who accepted the delayed start time by providing them with an incentive related to the event at a later time.

On the other hand, attendees who are late to the event may wish for a way to view the portions of the event that they are missing while traveling to the event after its start time. In some embodiments, the media guidance application may determine whether there is an arrival time of the plurality of arrival times greater than the delayed start time of the event, wherein the arrival time is associated with an attendee of the plurality of attendees. For example, the delayed start time of the movie showing of "Guardians of the Galaxy" may be 7:15 PM, but UserA's arrival time to AMC Theater 19 (where the movie showing is located) may be 7:25 PM. In this case, UserA may miss the beginning of "Guardians of the Galaxy."

In some embodiments, the media guidance application may, in response to determining that the arrival time greater than the delayed start time of the event, identify a mobile device associated with the attendee. For example, the media guidance application may access a user profile database and retrieve a user profile corresponding to UserA. The user profile may contain a device identifier corresponding to a mobile device associated with UserA. The media guidance application may use the device identifier to communicate with the mobile device associated with UserA.

In some embodiments, the media guidance application may transmit a component of the event to the mobile device. For example, because UserA will miss the first ten minutes of the movie showing of "Guardians of the Galaxy" due to his or her arrival time at AMC Theater 19, the media guidance application may transmit the first ten minutes of "Guardians of the Galaxy" to UserA's mobile device. UserA may then view the first ten minutes of "Guardians of the Galaxy" on his or her mobile device before entering AMC Theater 19 to view the rest of the movie.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 is a flowchart of illustrative steps for delaying the start of an event based on the arrival times of event attendees, in accordance with some embodiments of the disclosure.

DETAILED DESCRIPTION

Systems and methods are provided herein for altering a start time of an event based on indicia, retrieved from location applications corresponding to each attendee of the event attendees, of how late event attendees will be for the event. By altering the start time of the event based on how late attendees will be, more attendees will be able to experience the entire event. Moreover, by retrieving indicia of how late the attendees will be from location applications associated with the attendees, the start time of the event is altered with little disruption to the attendees.

Figure 1:
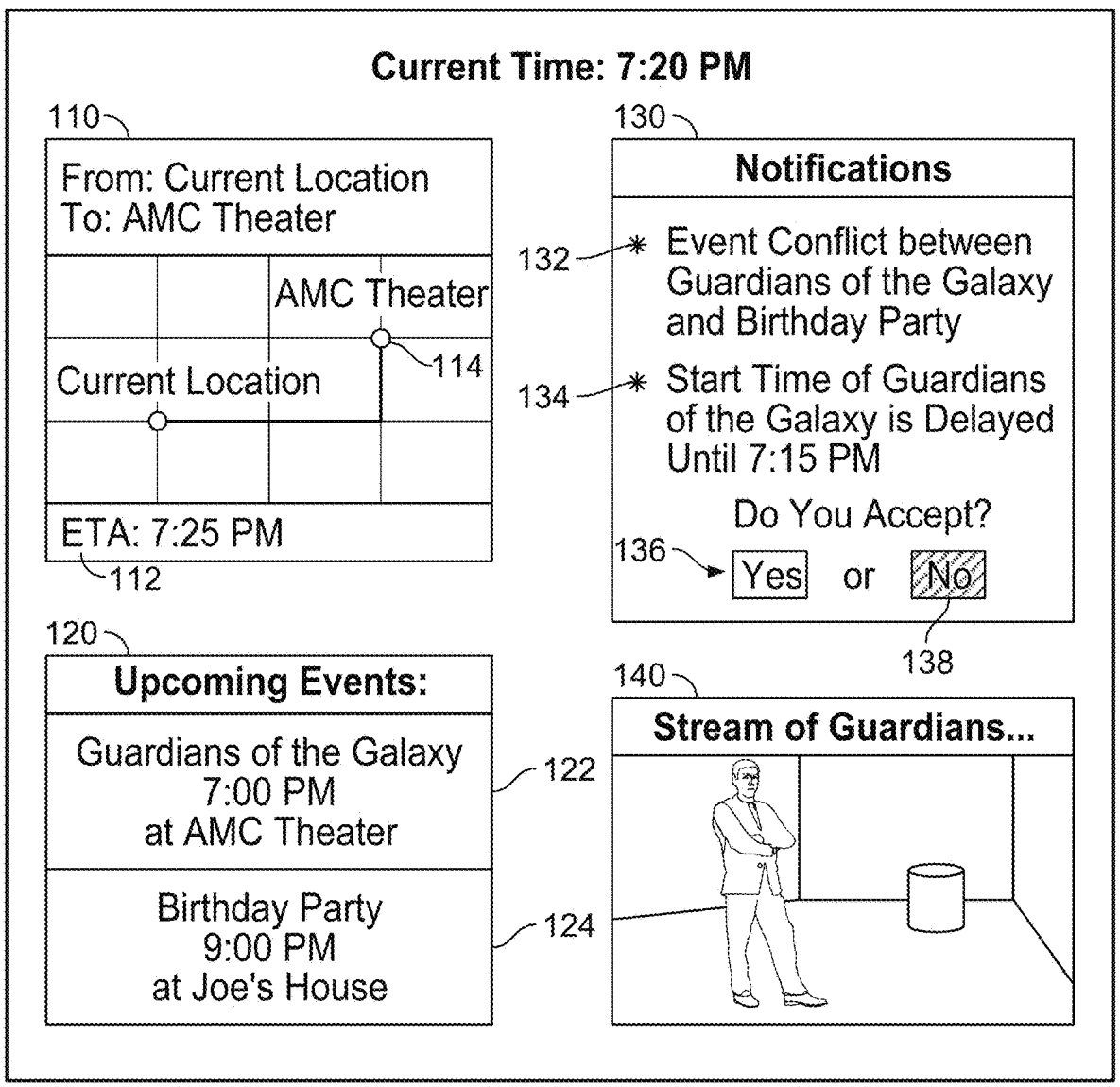
FIG. 1 shows an illustrative embodiment of a display screen of user equipment where a user has been notified of a delayed start time of an event, in accordance with some embodiments of the disclosure.

FIG. 1 shows an illustrative embodiment of a display screen of user equipment where a user has been notified of a delayed start time of an event, in accordance with some embodiments of the disclosure. The media guidance application generates for display content on display screen of user equipment 100. The media guidance application may be implemented on control circuitry implemented on user equipment 100, a remote server, or on control circuitry that is distributed between user equipment 100 and the remote server. The displayed content is generally directed to informing a user about a delayed start time of an event, where the delay to the start time of the event was caused by users' arrival times indicating that many users will be late. As used in this disclosure, the term "event" or any variant thereof refers to an occurrence happening at a determinable time and place that may be experienced by attendees. For example, an event may be a movie showing, a play, a wedding, a sporting event, a party, etc. While illustrated as a display screen in FIG. 1, this is merely illustrative, and the contents depicted on the display screen may be communicated to the user in any other manner (e.g., by audio output, tactile output, and any other suitable method).

In some embodiments, the media guidance application may generate for display a display corresponding to a location application 110. A location application, as used herein, is an instance of an application, system or program that can determine the location of a person or device and estimate, for that person or device, an arrival time at another location. A location application may be, for example, a global positioning system (GPS) accessed through a user's mobile phone that can determine the location of the mobile phone, determine travel routes between locations, and provide estimated arrival times when a user is traveling between two locations.

The display of location application 110 may comprise an estimated arrival time 112 (e.g., 7:25 PM) for the user, the current location of the user device, the event location 114 (e.g., AMC Theater) of the next event 122 the user is attending, and a possible path the user may take to travel between the two locations. As used in this disclosure, an estimated arrival time (ETA), also referred to as an arrival time, is a measure of when a user (or a device associated with the user) will arrive at an event location. The ETA is calculated by a location application associated with a respective user or device.

In some embodiments, the media guidance application may generate for display a display of upcoming events 120 the user plans to attend, such an event 122 and a second event 124. Upcoming event data may be stored, for example, in a calendar database. As used herein, a calendar database is a structured set of data held in a storage medium and relating to scheduling dates and times of user activity. The media guidance application may access the calendar database to determine upcoming events the user has indicated he or she will attend. The calendar database may be stored, for example, on user device 100 or on remote storage (e.g., storage 408 (FIG. 4)).

The media guidance application may generate for display notifications 130 to the user on the display screen of user equipment 100. As used herein, a notification is the delivery of information to a user without a specific request from the user. Notification 134 indicates to the user the delayed start time of event 122. The media guidance application may prompt the user to accept or reject the delayed start time of the event by pressing negative option 138 or positive option 136. Notification 132 indicates to the user that a conflict has been formed between two upcoming events 122, 124.

In some embodiments, the media guidance application may additionally transmit to the user device for display a component 140 of the event 122. As used herein, a component of an event is a portion of a whole event, such as the first ten minutes of a two-hour long movie.

To determine the delayed start time of an event, the media guidance application may first determine information about the event. In some aspects of the disclosure, the media guidance application may retrieve a data structure from an event information database associated with event 122. As used herein, an event information database is an organized collection of data relating to at least one event. It may contain data structures that each relate to an individual event or more than one event. The media guidance application may access, for example, an event information database hosted by a movie theater company, such as the movie theater company AMC Theaters, or from a third-party database that aggregates event information. For example, the event information database may be stored on remote servers for a third-party website that sells movie tickets and is accessed through the Internet.

The data structure retrieved from this database may contain a start time of the event, a location of the event, and a plurality of attendee identifiers corresponding to a plurality of attendees of the event. As used in this disclosure, the term "attendee" or any variant thereof refers to a person who is in any way indicated to be present at an event. For example, an attendee may have bought a ticket for a performance or movie showing, responded positively to a wedding invitation, accepted a social media invite, etc. For example, from the data structure, the media guidance application may determine that event 122 is a showing of a movie called "Guardians of the Galaxy" at 7:00 PM EST at AMC Theater 114 located at 175 Tremont Street Boston, Mass. The data structure may contain a plurality of attendee identifiers corresponding to a plurality of attendees of the event, such as a list of names of people who have bought tickets to see "Guardians of the Galaxy" at 7:00 PM EST at AMC Theater. For example, UserA, UserB, UserC, UserD, and UserE may have bought tickets online for the movie showing. In another example, the event may be a ballet performance that begins at 8:00 PM at the Boston Opera House and the attendee identifiers may include a list of names of dancers who are scheduled to appear in the ballet performance.

After determining attendee identifiers for event attendees, the media guidance application may determine when each attendee is expected to arrive at the event location. This can be determined through location applications corresponding to each of the attendees. In some embodiments, the media guidance application may determine, using the plurality of attendee identifiers, a plurality of location applications, wherein each attendee of the plurality of attendees corresponds to a respective location application of the plurality of location applications. The media guidance application may, for example, search a location application database using the list of names of people who have bought tickets to the movie showing to determine location applications associated with those people. The media guidance application may determine, for example, that UserA corresponds to location application GPS_A, while UserB corresponds to GPS_B.

The media guidance application may determine what devices these location applications are running on by querying the plurality of locations applications for address information. This allows the media guidance application to determine address information for a device associated with a particular user. The address information can be used to further communicate with the device. As used herein, address information refers to unique identifiers of a device assigned to a network interface. Address information can include, for example, Media Access Control (MAC) addresses, Internet Protocol (IP) addresses, and other forms of device identification. In some embodiments, the media guidance application may query the plurality of location applications to determine address information for a plurality of devices running the plurality of location applications, wherein each of the plurality of devices corresponds to a respective one of the plurality of attendees. For example, the media guidance application may contact location application 110 (e.g., GPS_A) associated with the user (e.g., UserA) and ask for address information (e.g., an IP address that could be used to communicate with a device) for the device (e.g., a mobile device, DeviceA) associated with location application 110 (e.g., GPS_A).

To determine when each attendee is expected to arrive at the location of the event, the media guidance application may query arrival times from the location applications corresponding to the plurality of attendees. In some embodiments, the media guidance application may query the plurality of location applications for a plurality of arrival times, each arrival time of the plurality of arrival times corresponding to a respective attendee of the plurality of attendees. The media guidance application may, for example, transmit a request through a communications network (to be described in further detail with respect to FIGS. 2-5), such as the Internet, to location application 110 for arrival time 112 for the user. The media guidance application may receive, in response to this request, arrival time 112 associated with the user. For example, the media guidance application may query location application 110 (e.g., GPS_A) for an arrival time for the user at event location 114, AMC Theater. Location application 110 may return, to the media guidance application, an arrival time 112 of 7:25 PM for the user.

To determine how late each attendee will be to the event, after the media guidance application has determined the plurality of arrival times, in some embodiments, the media guidance application may calculate a plurality of differences between the plurality of arrival times and the start time of the event. As used herein, a difference is a time deficit between the start time of an event and an arrival time at the event. For example, UserA may have arrival time 112 which is 7:25 PM but the start time of the event (as displayed at event 122) may be 7:00 PM. In this case, a difference (associated with UserA) of the plurality of differences would be 25 minutes.

The plurality of differences may be used to determine how long to delay the event. In some embodiments, the media guidance application may calculate a statistical representation of the plurality of differences. As used herein, a statistical representation is a single value representing a plurality of values, such as the plurality of differences between the start time of an event and the arrival times of event attendees. For example, the media guidance application may calculate the average of the plurality of the differences. For example, if the plurality of differences was 25 minutes, 15 minutes, 5 minutes, 10 minutes, and 20 minutes, the statistical representation may be 15 minutes.

In some embodiments, the media guidance may remove some differences from the plurality of differences when calculating the statistical representation. For example, the media guidance application may remove, from the plurality of differences, a difference corresponding to an attendee who is often late to events. To determine which attendees are often late to events, the media guidance application may determine a plurality of user profiles, wherein a user profile of the plurality of user profiles corresponds to an attendee of the plurality of attendees. The media guidance application may determine, based on the user profile, an event history of the attendee, wherein the event history comprises an indicator of punctuality. As used herein, an event history refers to data corresponding to events an attendee has participated in in the past. As used herein, an indicator of punctuality refers to a numerical representation of how often an attendee is punctual when attending events. For example, the media guidance application may access a user profile database and determine a user profile for UserB. The user profile for UserB may comprise an event history data structure containing event history information for UserB. The event history data structure may contain an indicator of punctuality for UserB, such as a percentage representing how many events UserB has arrived at "on time" out of the past events UserB has attended. For example, UserB may have attended 29 past events and been late to 23 of them. UserB's indicator in this case would be 6/29 or approximately 21 percent, which means UserB was on time to only 21 percent of the events he or she attended.

Once the media guidance application has determined an indicator of punctuality for an attendee, the media guidance application may compare the indicator of punctuality to a punctuality threshold. As used herein, a punctuality threshold refers to a minimum indicator of punctuality amount that is acceptable for a given attendee. For example, the punctuality threshold may be 50 percent. The media guidance application may compare UserB's 21 percent indicator of punctuality to the 50 percent punctuality threshold and determine that UserB falls below the punctuality threshold.

In some embodiments, the media guidance application may, in response to determining the event history of the attendee, remove, based on comparing the indicator of punctuality to the punctuality threshold, a difference of the plurality of differences from the plurality of differences, wherein the difference corresponds to the attendee. For example, the difference corresponding to UserB may be removed from the plurality of differences because UserB's 21 percent indicator of punctuality falls below the 50 percent punctuality threshold. The statistical representation may then be recalculated, using the plurality of differences, wherein the difference corresponding to UserB is no longer included in the plurality of differences. In this way, attendees who are habitually late to events will not skew the delayed start time of the event.

When calculating the statistical representation from the plurality of differences, which may be used to determine a delayed start time of the event (as described below), all attendees may not have equal importance. In some embodiments, the statistical representation may be a weighted average. The media guidance application may determine an importance weight of a plurality of importance weights corresponding to an attendee of the plurality of attendees, wherein the plurality of importance weights sums to one. For example, some attendees may be more important to the event than others. The importance of the attendees can be stored as importance weights that represent a fraction of 1. For example, if there are five attendees, the attendees may be weighted equally, with 0.2 assigned to each attendee as their importance weight. If, however, the event were a birthday party, the person whose birthday the party is celebrating, UserE for example, would be a more important attendee than any of the other attendees. In this case, UserE may have an importance weight of 0.6, while the four other attendees may have each have a 0.1 importance weight. The importance weights may, for example, be set by the host of the event or determined by the media guidance application based on the attendee role in the event.

The media guidance application may identify a difference of the plurality of differences corresponding to the attendee. For example, UserE may have an importance weight of 0.6 and an arrival time of 7:20 PM, and may, therefore, correspond to a difference of 20 minutes. In some embodiments, the media guidance application may multiply the difference by the importance weight to determine a weighted difference of a plurality of weighted differences. For example, the weighted difference of UserE may be 0.6 multiplied by 20, which results in a weighted difference of 12 minutes.

In some embodiments, the media guidance application may compute, using the plurality of weighted differences, a weighted average of the plurality of differences and assign the weighted average to be the statistical representation. For example, if the weights for UserA, UserB, UserC, UserD, and UserE were 0.1, 0.1, 0.1, 0.1, and 0.6, respectively, and the differences for these attendees were 25, 15, 5, 10, and 20 minutes, respectively, the weighted differences would be 2.5, 1.5, 0.5, 1.0, and 12 minutes, respectively. To compute the weighted average of the plurality of differences, the media guidance application may simply sum the plurality of weighted differences, to result in a weighted average of the plurality of differences equal to 17.5 minutes. The media guidance application may then assign 17.5 minutes as the statistical representation.

In some embodiments, the media guidance application may compare the statistical representation to a threshold. For example, the threshold may be set by the host of the event, such as AMC Theaters, and may represent an acceptable amount of time of the event for an attendee to miss. AMC Theaters may set, for example, a threshold of 5 minutes. The media guidance application may compare the 5 minutes threshold to a 15 minute statistical representation (representing the average amount the attendees are late by).

In some embodiments, the media guidance application may determine, based on the comparing, whether the statistical representation exceeds the threshold. For example, if the statistical representation is 15 minutes and the threshold is 5 minutes, the media guidance application may determine that the statistical representation is greater than the threshold. In some embodiments, the media guidance application may, in response to determining that the statistical representation exceeds the threshold, delay the start time of the event by an amount that is based on the statistical representation of the plurality of differences. For example, if the statistical representation is 15 minutes and the threshold is 5 minutes, the media guidance application may delay the start time of the event by 15 minutes. For example, the movie showing of "Guardians of the Galaxy" at AMC Theater 114 (event 122) may then have a start time of 7:15 PM rather than 7:00 PM. If, for example, the statistical representation was only 3 minutes and therefore less than the 5 minute threshold, the event would not be delayed. By comparing the statistical representation to the threshold, the systems and methods described herein guarantee that the event is not delayed for insignificant attendee delays.

If the event start time is delayed, in some embodiments, the media guidance application may transmit notification 134 to each of the plurality of devices comprising an indication of the delayed start time of the event. For example, the media guidance application may contact DeviceA at the address information (e.g., IP address) associated with DeviceA, which is associated with UserA. The media guidance application may transmit to DeviceA, for example, notification 134 that says "Start time of 'Guardians of the Galaxy' is delayed until 7:15 PM".

In some embodiments, notification 134 comprises a selectable option relating to the delayed start time, wherein the selectable option comprises a first option 138 and second option 136, the first option 138 being negative and the second option 136 being positive. As used herein, a selectable option refers to alternatives a user may choose, such as by "clicking" on one of the alternatives. For example, the notification may include two attendee-clickable options, one that says "yes" (second option 136) and one that says "no" (first option 138). UserA may, for example, click "no" to indicate that he or she does not approve of the delayed start time of 7:15 PM.

In some embodiments, the selectable option may allow an attendee to indicate whether he or she is willing to pay to delay the start time of the event. For example, by selecting (e.g., by clicking) the second (positive) option, the attendee may indicate that he or she is willing to pay a fee to delay the start time of the event. In some examples, selecting the second option may prompt the attendee to input payment information, use payment information that has already been stored in a user profile associated with the attendee to automatically charge the attendee, or any other suitable payment option. By selecting (e.g., by clicking) the first (negative) option, the attendee may indicate that he or she is not willing to pay to delay the start time of the event.

In some embodiments, the media guidance application may determine, using the data structure retrieved from the event information database, a group of attendees of the plurality of attendees, each of whom indicated, when indicating he or she would attend the event, acceptance of a delayed start time of the event. For example, an attendee may purchase a ticket to event 122 before the start time of the event. At the time of purchase, the attendee may indicate his or her acceptance of a possible delay to the start time of the event. This information may be stored in the data structure in the event information database. The media guidance application may retrieve the information from the data structure to determine whether an attendee accepts or rejects the delayed start time of the event.

In some embodiments, the media guidance application may determine, based on user profiles associated with the plurality of attendees, a default response to the selectable option. The default response may, for example, correspond to the first (negative) option or the second (positive) option. For example, an attendee may set up his or her user profile to reflect that he or she will always accept a delayed start time. In this example, the media guidance application may determine, based on the user profile, the attendee is associated with the second (positive) response to the selectable option and determine that this reflects a positive response to the selectable option. In some embodiments, because the media guidance application determined a default answer corresponding to the attendee, the media guidance application may transmit for display the notification comprising the delayed start time of the event without displaying the selectable option to the attendee.

For each attendee who responds positively or negatively to the selectable option of notification 134, the media guidance application will receive a response. Therefore, in some embodiments, the media guidance application may receive a plurality of responses, wherein each response of the plurality of responses corresponds to the selectable option. For example, if there are 80 attendees of the movie showing, the media guidance application may receive 80 responses from the 80 attendees. Each attendee response of the plurality of attendee responses may indicate whether the respective attendee approves of the delayed start time of the event.

In some embodiments, the media guidance application may determine a plurality of negative responses of the plurality of responses and a plurality of positive responses of the plurality of responses. For example, the media guidance application may determine whether each response was "yes" or "no". The media guidance application may sum the plurality of negative responses, sum the plurality of positive responses, and compare the summed plurality of negative responses to the summed plurality of positive responses. For example, the media guidance application may have notified 80 attendees of the delayed start time and received 60 responses. Of the 60 responses the media guidance application may sum the positive "yes" responses to determine 23 attendees accepted the delayed start time. The media guidance application may then sum the negative "no" responses to determine 37 attendees rejected the delayed start time.

The media guidance application may compare the summed plurality of positive responses to the summed plurality of negative responses to determine that more attendees rejected the delayed start time than accepted it.

In some embodiments, the media guidance application may recalculate, based on comparing the summed plurality of negative responses to the summed plurality of positive responses, the delayed start time. For example, if more attendees rejected (e.g., by selecting first option 138) the delayed start time than accepted (e.g., by selecting second option 136) the delayed start time (i.e. the summed plurality of negative responses was greater than the summed plurality of positive responses), the delayed start time might be adjusted to an earlier (less delayed time). For example, the delayed start time may be 7:15 PM but the recalculated start time may be 7:10 PM.

In some embodiments, the media guidance application may determine, based on delaying the start time of the event, an end time of the event. For example, the media guidance application may determine from the data structure retrieved from the event information database that event 122 (a movie showing of "Guardians of the Galaxy") lasts two hours. In this example, if the event 122 has a delayed start time of 7:15 PM, the media guidance application may determine the end time of the event to be 9:15 PM.

In some embodiments, the media guidance application may retrieve, from a calendar database, calendar information for the plurality of attendees. For example, the media guidance application may retrieve calendar information for UserA. This calendar information for UserA may contain upcoming events 120 that the User A has indicated he or she will attend. It may contain the start time of the next event that UserA will be attending. For example, UserA may have an event 124 scheduled to begin at 9:00 PM.

In some embodiments, the media guidance application may compare the calendar information to the end time. For example, the media guidance application may compare UserA's next event 124 that begins at 9:00 PM to event 122's end time that was calculated as 9:15 PM. For example, UserA may plan to attend event 124 Birthday Party that begins at 9:00 PM at 24 Beacon St Boston, Mass.

In some embodiments, the media guidance application may determine, for each attendee of the plurality of attendees, based on comparing the calendar information to the end time, whether a conflict exists between the end time and the calendar information. For example, the media guidance application may determine that a conflict exists for UserA because the start time of UserA's next event 124 is before the end time of the delayed event 122.

In some embodiments, the media guidance application may generate for display, to each attendee of the plurality of attendees for whom a conflict is determined to exist, an indication 132 that a conflict has been formed. For example, the media guidance application may generate a notification 132 for display on UserA's mobile device that informs UserA that there is a conflict (e.g., by generating a text message that says "Event conflict between 'Guardians of the Galaxy' and 'Birthday Party'" to display on UserA's mobile device).

In some embodiments, the media guidance application may determine a conflict event 124 corresponding to a respective conflict of the conflicts existing between the end time and the calendar information, wherein the conflict event 124 is associated with an attendee of the plurality of attendees. For example, the media guidance application may determine that UserA's next conflict event 124 is an event called Birthday Party scheduled to begin at 9:00 PM at 24 Beacon St Boston, Mass.

In some embodiments, the media guidance application may retrieve a data structure associated with conflict event 124, wherein the data structure comprises an identifier of a person who is scheduled to attend the conflict event. For example, the media guidance application may access a Birthday Party event information database and retrieve a data structure containing a list of Birthday Party attendees. For example, the data structure may contain information that the Birthday Party is to celebrate Joe's birthday and may contain an identifier indicating Joe is attending event 124.

In some embodiments, the media guidance application may alert the person who is scheduled to attend the conflict event that, based on the delayed start time, there is a schedule conflict associated with the conflict event. For example, the media guidance application may transmit a notification to Joe that there is a schedule conflict with the Birthday Party event 124 for UserA.

In some embodiments, the media guidance application may implement an algorithm to determine an event start time that causes the least inconvenience for event attendees. In some embodiments, the media guidance application may determine a latest arrival time of the plurality of arrival times. For example, the latest arrival time of the plurality of arrival times may be 7:25 PM. The media guidance application may determine that this is the latest arrival time by, for example, comparing each arrival time to each of the plurality of arrival times, storing a latest arrival time variable, and updating the latest arrival time variable if a new latest arrival time is found while comparing the arrival times.

In some embodiments, the media guidance application may retrieve from the event information database a second data structure. The second data structure may contain information such as a start time of a next event held at the location 114 of the event. For example, the media guidance application may determine the movie "Edge of Tomorrow" is playing directly after the movie "Guardians of the Galaxy" in AMC Theater Room 12. The media guidance application may recalculate the delayed start time of the event based on the start time of the next event held in the same location as the location of the event. For example, if "Guardians of the Galaxy" has an end time of 9:15 PM, while "Edge of Tomorrow" has a start time of 9:05 PM, the media guidance application may recalculate the delayed start time of "Guardians of the Galaxy" to ensure that the end time of "Guardians of the Galaxy" is before the start time of "Edge of Tomorrow." For example, to remove the time conflict between the showings in AMC Theater 114 Room 12 of "Guardians of the Galaxy" and "Edge of Tomorrow," the recalculated delayed start time of "Guardians of the Galaxy" may be 7:02 PM and the end time corresponding to the recalculated delayed start time may be 9:02 PM, which is before the start time of "Edge of Tomorrow."

In some embodiments, the media guidance application may determine a new event location near the location of the event, wherein the new event location is available at the start time of the next event held in the same location as the location of the event. In some embodiments, rather than recalculating the delayed start time of the event, the media guidance application may assign the new event location to the next event held at the location of the event. For example, the media guidance application may determine the movie "Edge of Tomorrow" is playing directly after the movie "Guardians of the Galaxy" in AMC Theater 114 Room 12.

The media guidance application may determine that AMC Theater 114 Room 13 is near the location of the event (AMC Theater 12) and available at the start time of the movie showing of "Edge of Tomorrow." For example, if "Guardians of the Galaxy" has an end time of 9:15 PM (due to the delayed start time of the event), while "Edge of Tomorrow" has a start time of 9:05 PM, the media guidance application may assign the movie showing of "Edge of Tomorrow" to AMC Theater 19 Room 13, rather than AMC Theater 19 Room 12.

In some embodiments, the media guidance application may determine a plurality of candidate delayed start times between the start time and the latest arrival time. For example, the media guidance application may determine the start time of the movie showing event is 7:00 PM, while the latest arrival time is 7:25 PM. Candidate delayed start times may include, for example, 7:05 PM, 7:10 PM, 7:15 PM, and 7:20 PM.

In some embodiments, the media guidance application may calculate, for each candidate delayed start time of the plurality of delayed start times, a corresponding candidate delayed end time. For example, the media guidance application may determine from the data structure retrieved from the event information database that the movie showing of "Guardians of the Galaxy" lasts two hours. Candidate delayed end times may then be calculated by adding the event time to the candidate delayed start times. For example, candidate delayed end times may include 9:05 PM, 9:10 PM, 9:15 PM, and 9:20 PM.

In some embodiments, the media guidance application may use the retrieved calendar information for each of the plurality of attendees to determine, by comparing the calendar information to each candidate delayed end time, a number of attendees of the plurality of attendees who would have a calendar conflict with a corresponding candidate delayed end time for each candidate delayed start time. For example, by delaying the start of the movie showing to 7:20 PM, the end time of the movie showing would be 9:20 PM. If the movie showing ends at 9:20 PM this may cause calendar conflicts for 17 attendees. By delaying the start time of the movie to 7:15 PM, the end time of the movie showing would be 9:15 PM. A movie showing end time of 9:15 PM may cause calendar conflicts for only 7 attendees.

In some embodiments, the media guidance application may assign the start time of the event as the candidate delayed start time corresponding to a candidate delayed end time corresponding to a lowest number of attendees of the plurality of attendees who would have a calendar conflict with the corresponding candidate delayed end time. For example, a start time of 7:15 PM (and corresponding delayed end time of 9:15 PM) may cause calendar conflicts for 7 attendees. Out of all of the candidate start times and corresponding end times, 7:15 PM could be the start time that causes the least inconvenience to the most attendees because the other candidate start times resulted in calendar conflicts for more than 7 attendees. In this case, the media guidance application would assign the start time of the movie showing to be 7:15 PM.

In some embodiments, the media guidance application may transmit media assets to user devices associated with the attendees to decrease the frustration associated with missing an event or delaying the start time of an event. In some embodiments, the media guidance application may access a location database containing a plurality of device identifiers corresponding to a plurality of device locations. For example, the media guidance application may access a global positioning system (GPS) database that contains device identifiers for every device near a certain location.

In some embodiments, the media guidance application may retrieve, from the location database, a plurality of device identifiers corresponding to a plurality of devices at the location of the event, wherein the plurality of devices corresponds to a plurality of device owners. For example, the media guidance application may access the GPS database and retrieve a list of user devices that are currently at the event location, such as AMC Theater 114, where "Guardians of the Galaxy" was scheduled to start at 7:00 PM (event 122). For example, UserC may have arrived at AMC Theater 114 before the delayed start time of 7:15 PM. UserC may be bored while waiting for the movie showing to begin and may wish to view a media asset related to "Guardians of the Galaxy."

In some embodiments, the media guidance application may retrieve, from the event information database, a media asset related to the event. For example, if the event is a movie showing of "Guardians of the Galaxy" (event 122), the media guidance application may retrieve the movie trailer for "Guardians of the Galaxy" from the event information database.

In some embodiments, the media guidance application may prompt each device owner of the plurality of device owners to accept the media asset. For example, the media guidance application may display a notification on the user devices (e.g., mobile devices) at the event that says "Would you like to view the movie trailer for 'Guardians of the Galaxy?'" and provides "yes" and "no" options that the users can click to indicate their acceptance ("yes") or rejection ("no") of the movie trailer. For example, UserC may view a notification displayed on his or her phone and select either "yes" to view the movie trailer or "no" to not watch the movie trailer.

The media guidance application may, in response to a device owner of the plurality of device owners accepting the media asset, transmit the media asset to a device corresponding to the device owner of the plurality of devices. For example, if UserC clicks the "yes" option, the "Guardians of the Galaxy" movie trailer may be transmitted to UserC's mobile device, where UserC may then view the movie trailer.

In some embodiments, the media guidance application may provide the plurality of device owners with an incentive to accept the delayed start time of the event. For example, the media guidance application may transmit to the plurality of device owners (e.g., attendees who have at the location of the event before the delayed start time of the event) a reward or incentive to accept (e.g., via the selectable option described above) the delayed start time of the event. For example, the media guidance application may transmit to the plurality of device owners, based on whether they respond positively to the selectable option, a free or reduced cost version of the movie (e.g., "Guardians of the Galaxy") they plan to view at the event location 114 (e.g., AMC Theater), when the movie is released to the general public on demand. This incentive rewards the early attendees who accepted the delayed start time by providing them with an incentive related to the event at a later time.

On the other hand, attendees who are late to the event may wish for a way to view the portions of the event that they are missing while traveling to the event after its start time. In some embodiments, the media guidance application may determine whether there is an arrival time of the plurality of arrival times greater than the delayed start time of the event, wherein the arrival time is associated with an attendee of the plurality of attendees. For example, the delayed start time of the movie showing of "Guardians of the Galaxy" may be 7:15 PM, but UserA's arrival time 112 to event location 114 (where the movie showing is located) may be 7:25 PM. In this case, UserA may miss the beginning of "Guardians of the Galaxy."

In some embodiments, the media guidance application may, in response to determining that arrival time 112 greater than the delayed start time of the event, identify a mobile device associated with the attendee. For example, the media guidance application may access a user profile database and retrieve a user profile corresponding to UserA. The user profile may contain a device identifier corresponding to a mobile device associated with UserA. The media guidance application may use the device identifier to communicate with the mobile device associated with UserA.

In some embodiments, the media guidance application may transmit a component 140 of the event to the mobile device. Because the user will miss part of event 122 due to his or her arrival time 112 at event location 113, the media guidance application may transmit the component 140 of the event 122 that the user will miss of the event 122 to user equipment 100. For example, because UserA will miss the first ten minutes of the movie showing of "Guardians of the Galaxy" (event 122) due to his or her arrival time at AMC Theater 114, the media guidance application may transmit the first ten minutes of "Guardians of the Galaxy" (component 140) to UserA's user equipment 100. UserA may then view the first ten minutes of "Guardians of the Galaxy" (component 140) on his or her user equipment 100 before entering AMC Theater 114 to view the rest of event 122.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, movie showings, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a digital movie projector, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
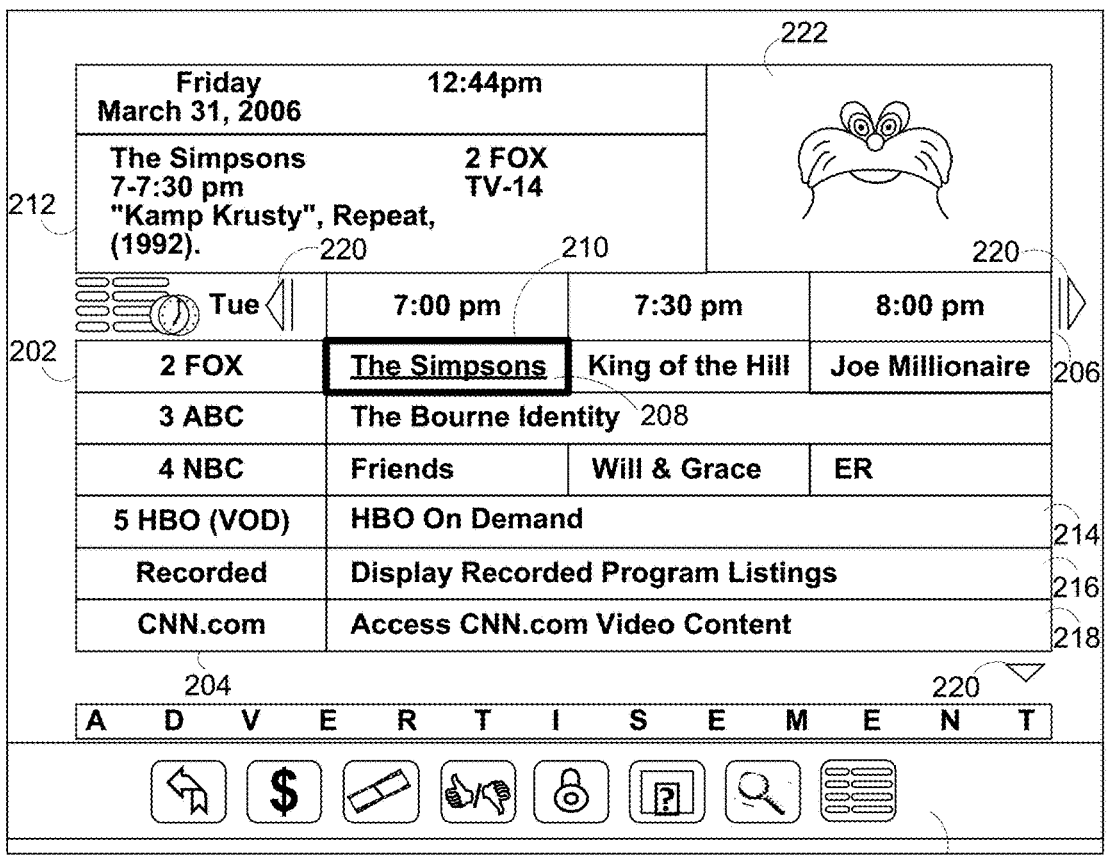
FIG. 2 shows an illustrative example of a display screen for use in accessing media content, in accordance with some embodiments of the disclosure.
Figure 3:
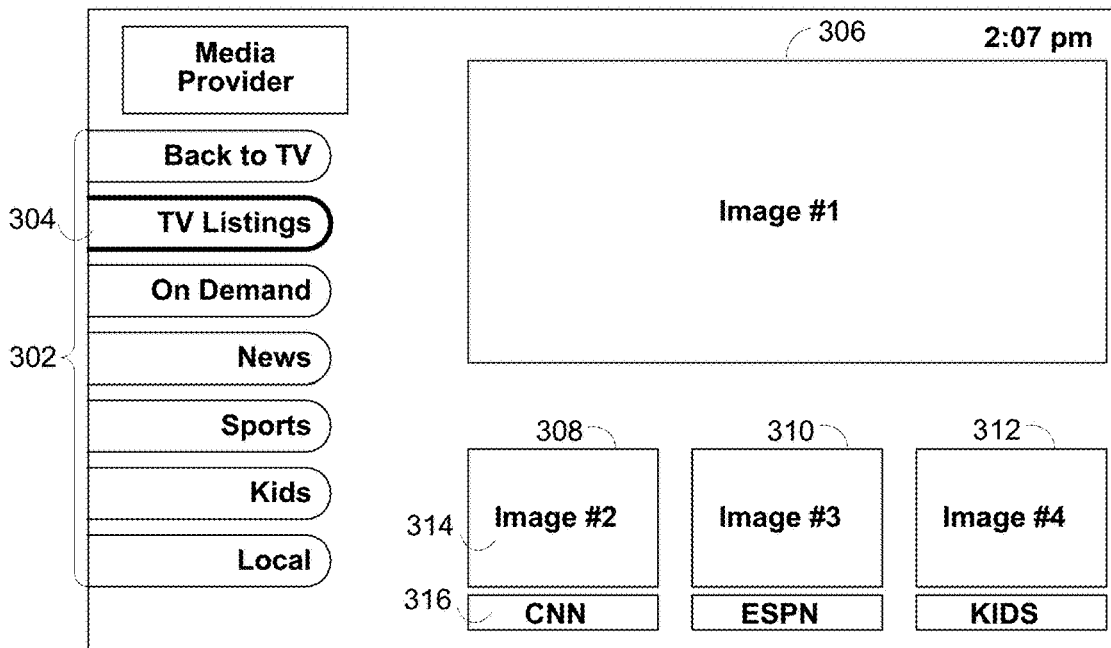
FIG. 3 shows another illustrative example of a display screen used in accessing media content, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/ 0153885, filed Nov. 12, 2009, which is hereby incorporated by reference herein in its entirety.

Figure 4:
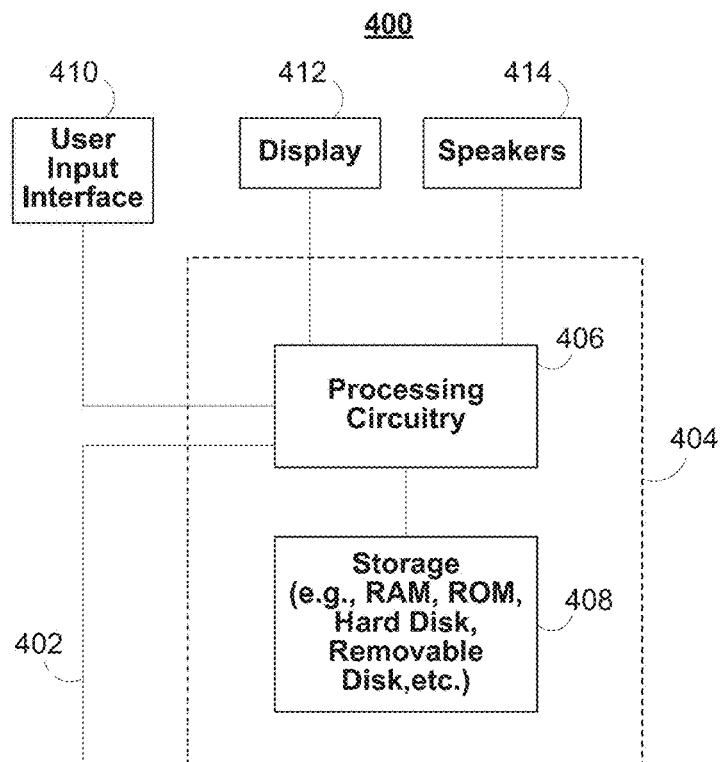
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
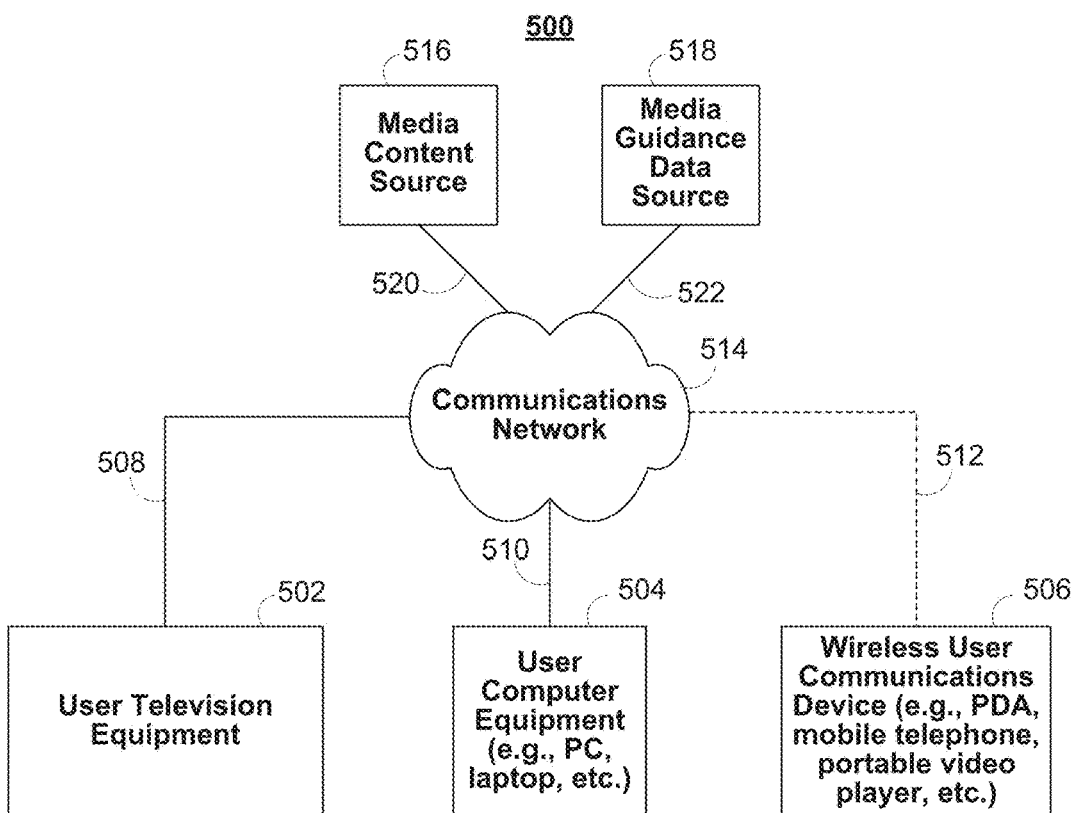
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
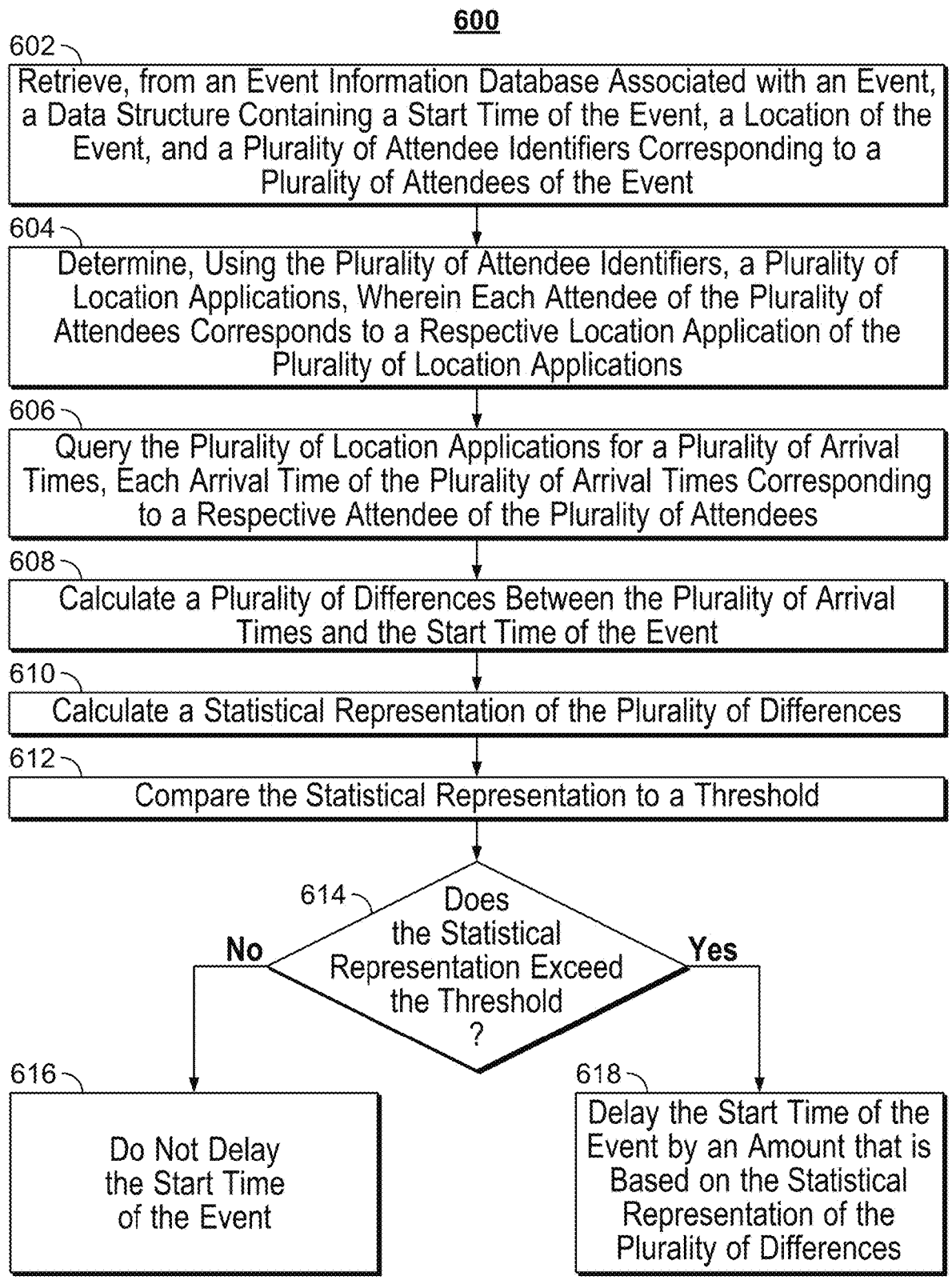
FIG. 6 is a flowchart of illustrative steps for delaying the start of an event based on the arrival times of event attendees, in accordance with some embodiments of the disclosure.

FIG. 6 is a flowchart of illustrative steps for delaying the start of an event based on the arrival times of event attendees, in accordance with some embodiments of the disclosure. Process 600 begins at 602, where the media guidance application retrieves (e.g., via control circuitry 404 over communications network 514), from an event information database (e.g., stored in storage 408) associated with an event, a data structure. For example, the media guidance application may access (e.g., via control circuitry 404 over communications network 514) an event information database hosted by a movie theater company, such as the movie theater company AMC Theaters, or from a third-party database that aggregates event information. The data structure retrieved from the event information database may contain a start time of the event, a location of the event, and a plurality of attendee identifiers corresponding to a plurality of attendees of the event. For example, from the data structure, the media guidance application may determine (e.g., via control circuitry 404) that the event is a showing of a movie called "Guardians of the Galaxy" at 7:00 PM EST at AMC Theater 19 located at 175 Tremont Street Boston, Mass. The data structure may contain a plurality of attendee identifiers corresponding to a plurality of attendees of the event, such as a list of names of people who have bought tickets to see "Guardians of the Galaxy" at 7:00 PM EST at AMC Theater 19. For example, UserA, UserB, UserC, UserD, and UserE may have bought tickets online for the movie showing.

Process 600 continues to 604, where the media guidance application determines (e.g., via control circuitry 404), using the plurality of attendee identifiers, a plurality of location applications, wherein each attendee of the plurality of attendees corresponds to a respective location application of the plurality of location applications. For example, the media guidance application may search a location application database using the list of names of people who have bought tickets to the movie showing. The media guidance application may determine, for example, that UserA corresponds to location application GPS_A, while UserB corresponds to GPS_B.

Process 600 continues to 606, where the media guidance application queries (e.g., via control circuitry 404 over communications network 514) the plurality of location applications for a plurality of arrival times, each arrival time of the plurality of arrival times corresponding to a respective attendee of the plurality of attendees. For example, the media guidance application may query GPS_A for an arrival time for UserA at AMC Theater 19. GPS_A may return, to the media guidance application, an arrival time of 7:25 PM for UserA.

Process 600 continues to 608, where the media guidance application calculates (e.g., via control circuitry 404) a plurality of differences between the plurality of arrival times and the start time of the event. For example, UserA may have an arrival time of 7:25 PM but the start time of the event may be 7:00 PM. In this case, a difference (associated with UserA) of the plurality of differences would be 25 minutes.

Process 600 continues to 610, where the media guidance application calculates (e.g., via control circuitry 404) a statistical representation of the plurality of differences. For example, the media guidance application may calculate (e.g., via control circuitry 404) the average of the plurality of the differences. For example, if the plurality of differences was 25 minutes, 15 minutes, 5 minutes, 10 minutes, and 20 minutes, the statistical representation may be 15 minutes.

Process 600 continues to 612, where the media guidance application compares (e.g., via control circuitry 404) the statistical representation to a threshold. For example, the threshold may be set by the host of the event, such as AMC Theaters, and may represent an acceptable amount of time of the event for an attendee to miss. AMC Theaters may set, for example, a threshold of 5 minutes. The media guidance application may compare the 5 minute threshold to a 15 minute statistical representation (representing the average amount the attendees are late by).

Process 600 continues to 614, where the media guidance application determines (e.g., via control circuitry 404) whether the statistical representation exceeds the threshold. If the statistical representation does not exceed the threshold, process 600 continues to 616, where the media guidance application does not delay the start time of the event. If the statistical representation does exceed the threshold, process 600 continues to 618, where the media guidance application delays (e.g., via control circuitry 404) the start time of the event by an amount that is based on the statistical representation of the plurality of differences. For example, if the statistical representation is 15 minutes and the threshold is 5 minutes, the media guidance application may determine that the statistical representation is greater than the threshold. In some embodiments, the media guidance application may, in response to determining that the statistical representation exceeds the threshold, delay the start time of the event by an amount that is based on the statistical representation of the plurality of differences. For example, if the statistical representation is 15 minutes and the threshold is 5 minutes, the media guidance application may delay the start time of the event by 15 minutes. For example, the movie showing of "Guardians of the Galaxy" at AMC Theater 19 may then have a start time of 7:15 PM rather than 7:00 PM. If, for example, the statistical representation was only 3 minutes and therefore less than the 5 minute threshold, the event would not be delayed. By comparing the statistical representation to the threshold, the systems and methods described herein guarantee that the event is not delayed for insignificant attendee delays.

Figure 7:
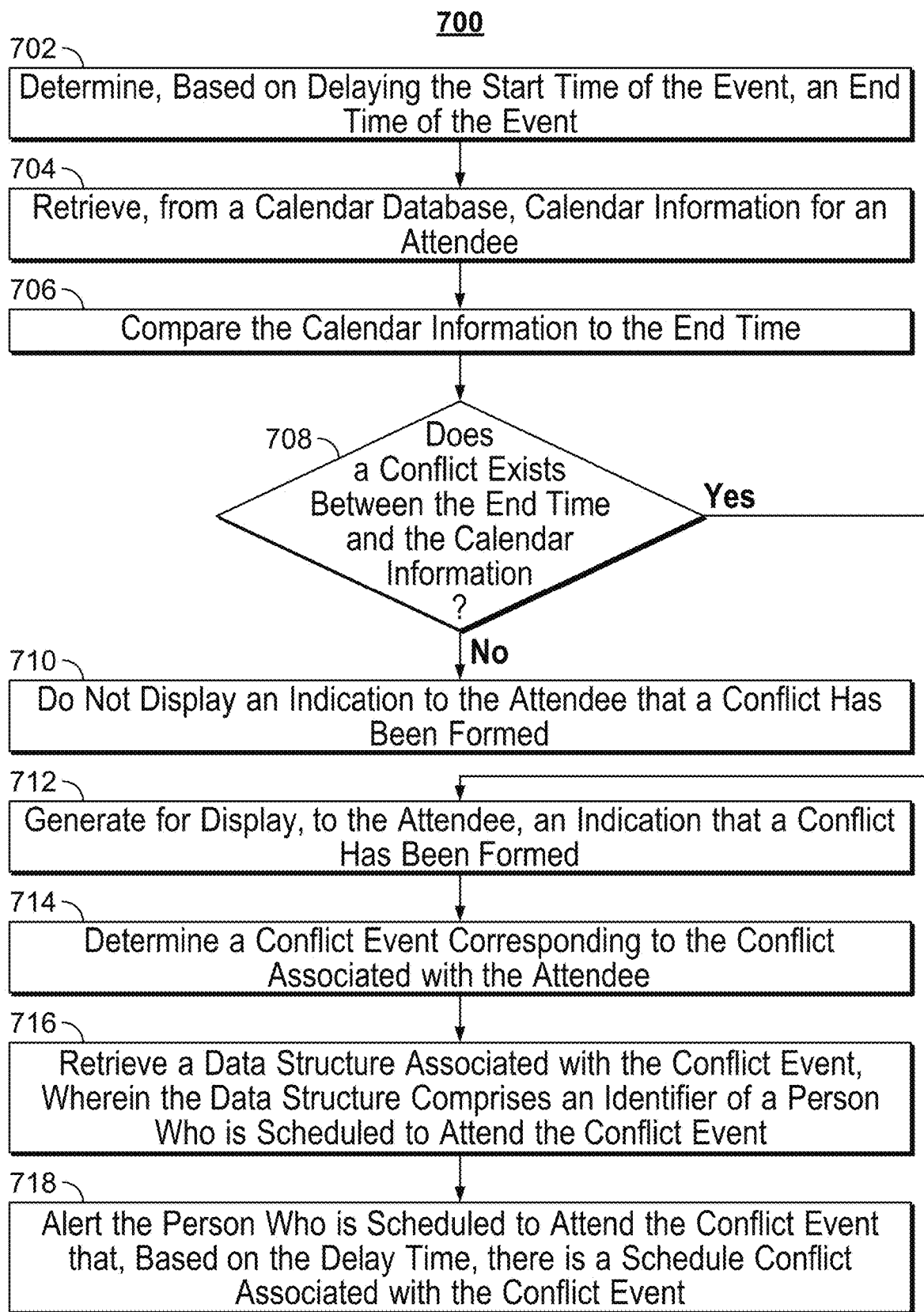
FIG. 7 is a flowchart of illustrative steps for determining calendar conflicts for attendees based on a delayed start time of an event, in accordance with some embodiments of the disclosure.

FIG. 7 is a flowchart of illustrative steps for determining calendar conflicts for attendees based on a delayed start time of an event, in accordance with some embodiments of the disclosure. For example, a media guidance application may instruct control circuitry 404 to execute the elements of process 700. Process 700 may be iterated for each attendee of a plurality of attendees.

Process 700 begins at 702, where the media guidance application determines (e.g., via control circuitry 404), based on delaying the start time of the event, an end time of the event. For example, the media guidance application may determine from the data structure retrieved from the event information database that the movie showing of "Guardians of the Galaxy" lasts two hours. In this example, if the movie showing's delayed start time is 7:15 PM, the media guidance application may determine the end time of the event to be 9:15 PM.

Process 700 continues to 704, where the media guidance application retrieves (e.g., via control circuitry 404 over communications network 514), from a calendar database, calendar information for an attendee. For example, the media guidance application may retrieve calendar information for UserA. This calendar information for UserA may contain the start time of the next event that UserA will be attending. For example, UserA may have an event scheduled to begin at 9:00 PM.

Process 700 continues to 706, where the media guidance application compares (e.g., via control circuitry 404) the calendar information to the end time. For example, the media guidance application may compare UserA's next event that begins at 9:00 PM to the movie showing end time of 9:15 PM.

Process 700 continues to 708, where the media guidance application determines (e.g., via control circuitry 404) whether a conflict exists between the end time and the calendar information. If a conflict does not exist, process 700 continues to 710, where the media guidance application does not display an indication to the attendee that a conflict has been formed.

If a conflict does exist, process 700 continues to 712, where the media guidance application generates (e.g., via control circuitry 404) for display, to the attendee, an indication that a conflict has been formed. For example, the media guidance application may determine that a conflict exists for UserA because the start time of UserA's next event is before the end time of the delayed movie showing. The media guidance application may generate a notification for display on UserA's mobile device that informs UserA that there is a conflict (e.g., by generating a text message that says "The delayed start time of 'Guardians of the Galaxy' has resulted in an event conflict." to display on UserA's mobile device).

If a conflict does exist, process 700 then continues to 714, where the media guidance application determines (e.g., via control circuitry 404) a conflict event corresponding to the conflict associated with the attendee. For example, the media guidance application may determine that UserA's next event is an event called Birthday Party scheduled to begin at 9:00 PM at 24 Beacon St., Boston, Mass.

If a conflict does exist, process 700 then continues to 716, where the media guidance application retrieves (e.g., via control circuitry 404 over communications network 514) a data structure associated with the conflict event, wherein the data structure comprises an identifier of a person who is scheduled to attend the conflict event. For example, the media guidance application may access a Birthday Party event information database and retrieve a data structure containing a list of Birthday Party attendees. For example, the data structure may contain information that the Birthday Party is to celebrate Joe's birthday and may contain an identifier indicating Joe is attending the event.

If a conflict does exist, process 700 then continues to 718, where the media guidance application alerts (e.g., via control circuitry 404 over communications network 514) the person who is scheduled to attend the conflict event that, based on the delay time, there is a schedule conflict associated with the conflict event. For example, the media guidance application may transmit a notification to Joe that there is a schedule conflict with the Birthday Party event for UserA.

Figure 8:
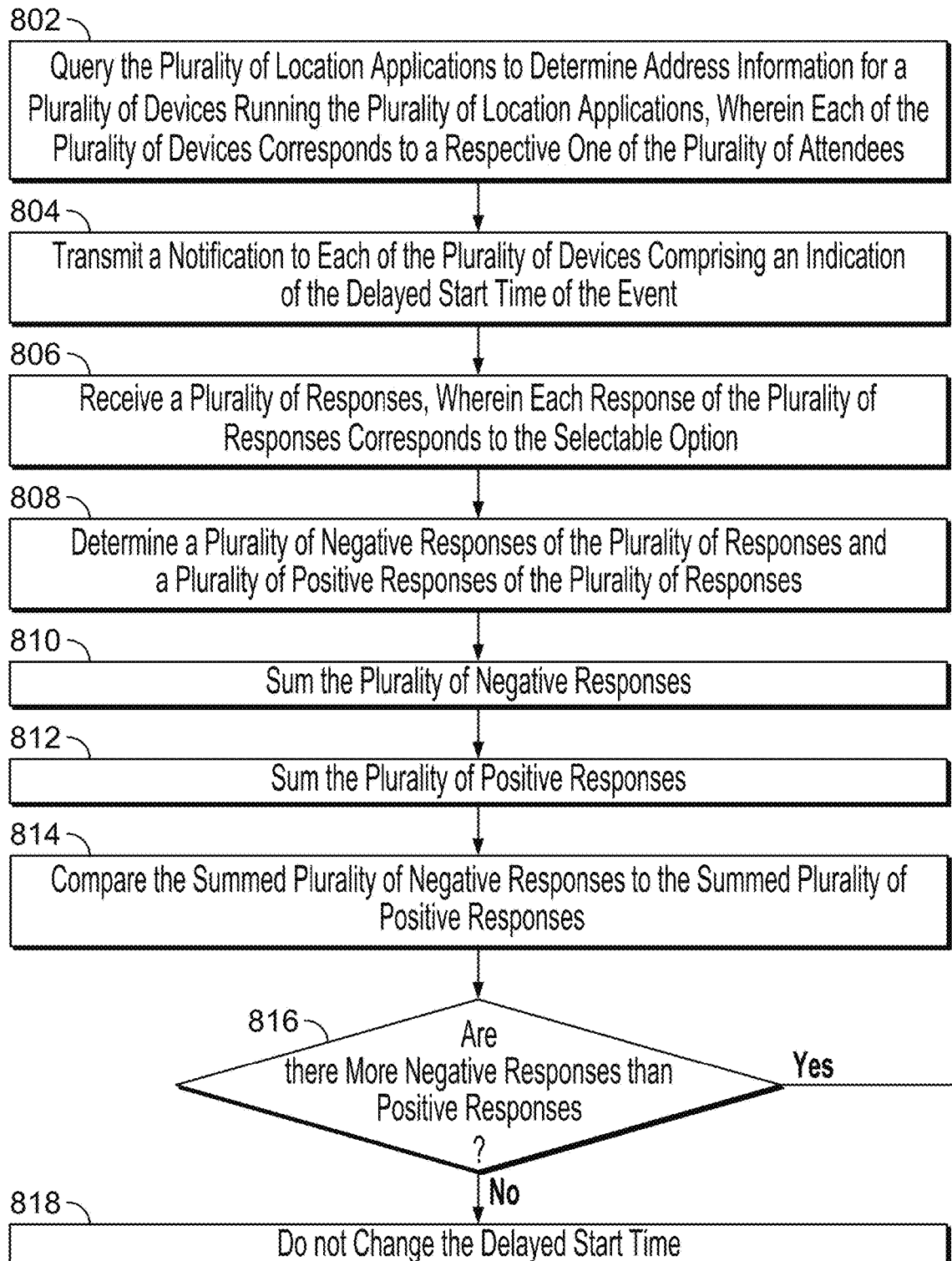
FIG. 8 is a flowchart of illustrative steps for recalculating a delayed start time of an event, in accordance with some embodiments of the disclosure.
Figure 8:
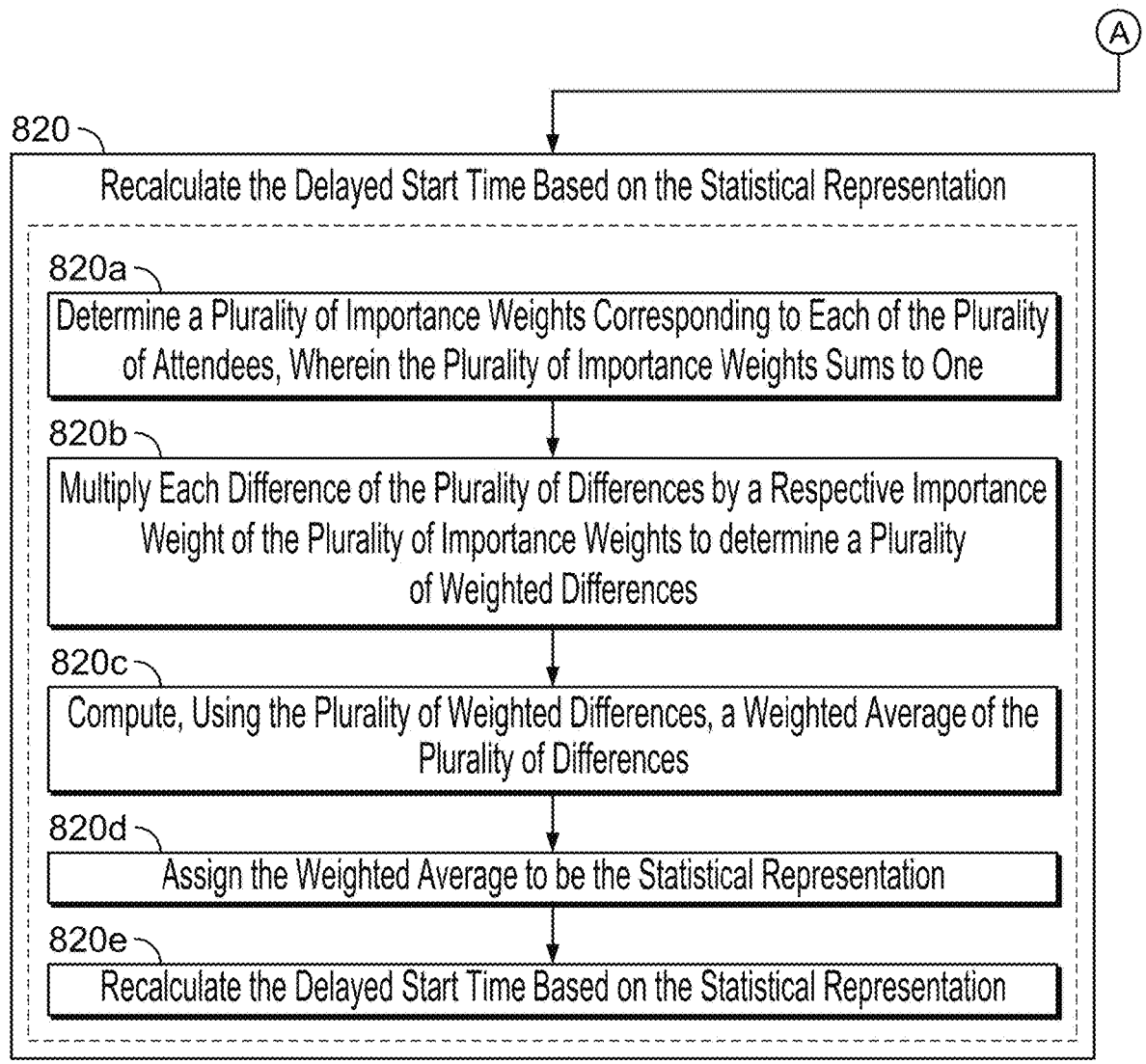

FIG. 8 is a flowchart of illustrative steps for recalculating a delayed start time of an event, in accordance with some embodiments of the disclosure. For example, a media guidance application may instruct control circuitry 404 to execute the elements of process 800.

Process 800 begins at 802, where the media guidance application queries (e.g., via control circuitry 404 over communications network 514) the plurality of location applications to determine address information for a plurality of devices running the plurality of location applications, wherein each of the plurality of devices corresponds to a respective one of the plurality of attendees. For example, the media guidance application may contact the location application GPS_A associated with UserA and ask for address information (e.g., an IP address that could be used to communicate with a device) for the device (e.g., a mobile device, DeviceA) associated with GPS_A.

Process 800 continues to 804, where the media guidance application transmits (e.g., via control circuitry 404 over communications network 514) a notification to each of the plurality of devices comprising an indication of the delayed start time of the event. For example, the media guidance application may contact DeviceA at the address information (e.g., IP address) associated with DeviceA, which is associated with UserA. The media guidance application may transmit to DeviceA, for example, a notification that says "The start time of 'Guardians of the Galaxy' is delayed to 7:15 PM." The notification may comprise a selectable option relating to the delayed start time, wherein the selectable option comprises a first option and a second option, the first option being negative and the second option being positive. For example, the notification may include two attendee-clickable options, one that says "yes" and one that says "no." UserA may, for example, click "no" to indicate that the he or she does not approve of the delayed start time of 7:15 PM.

Process 800 continues to 806, where the media guidance application receives (e.g., via control circuitry 404 over communications network 514) a plurality of responses, wherein each response of the plurality of responses corresponds to the selectable option. For example, if there are 80 attendees of the movie showing, the media guidance application may receive 80 responses from the 80 attendees. Each attendee response of the plurality of attendee responses may indicate whether the respective attendee approves of the delayed start time of the event.

Process 800 continues to 808, where the media guidance application determines (e.g., via control circuitry 404) a plurality of negative responses of the plurality of responses and a plurality of positive responses of the plurality of responses. For example, the media guidance application may determine whether each response was "yes" or "no."

Process 800 continues to 810, where the media guidance application sums (e.g., via control circuitry 404) the plurality of negative responses. For example, the media guidance application may have notified 80 attendees of the delayed start time and received 60 responses. The media guidance application may then sum the negative "no" responses to determine 37 attendees rejected the delayed start time.

Process 800 continues to 812, where the media guidance application sums (e.g., via control circuitry 404) the plurality of positive responses. For example, the media guidance application may have notified 80 attendees of the delayed start time and received 60 responses. Of the 60 responses the media guidance application may sum the positive "yes" responses to determine 23 attendees accepted the delayed start time.

Process 800 continues to 814, where the media guidance application compares (e.g., via control circuitry 404) the summed plurality of negative responses to the summed plurality of positive responses. For example, the media guidance application may compare the 23 positive responses to the 37 negative responses.

Process 800 continues to 816, where the media guidance application determines (e.g., via control circuitry 404) whether there more negative responses than positive responses. If the summed plurality of positive responses exceeds the summed plurality of negative responses, process 800 continues to 818, where the media guidance application does not change the delayed start time.

If the summed plurality of negative responses exceeds the summed plurality of positive responses, process 800 continues to 820, where the media guidance application recalculates (e.g., via control circuitry 404) the delayed start time based on the statistical representation. For example, the media guidance application may compare the 23 positive responses to the 37 negative responses to determine that more attendees rejected the delayed start time than accepted it. For example, because more attendees rejected the delayed start time than accepted the delayed start time (i.e., the summed plurality of negative responses was greater than the summed plurality of positive responses), the delayed start time might be adjusted to an earlier (less delayed) time. For example, the delayed start time may be 7:15 PM but the recalculated start time may be 7:10 PM.

One method of recalculating the delayed start time is shown in steps 820*a* through 820*e*. These steps are non-limiting and show only an example of how step 820 may be accomplished. Step 820 of process 800 may begin at step 820*a*, where the media guidance application determines (e.g., via control circuitry 404) a plurality of importance weights corresponding to each of the plurality of attendees, wherein the plurality of importance weights sums to one. For example, some attendees may be more important to the event than others. The importance of the attendees are stored as importance weights that represent a fraction of 1. For example, if there are five attendees, the attendees may be weighted equally, with 0.2 assigned to each attendee as their importance weight. If, however, the event were a birthday party, the person whose birthday the party is celebrating, UserE for example, would be a more important attendee than any of the other attendees. In this case, UserE may have an importance weight of 0.6, while the four other attendees may have each have a 0.1 importance weight. The importance weights may, for example, be set by the host of the event or determined by the media guidance application based on the attendee's role in the event.

Step 820 of process 800 may continue to 820*b*, where the media guidance application multiplies (e.g., via control circuitry 404) each difference of the plurality of differences by a respective importance weight of the plurality of importance weights to determine a plurality of weighted differences. The media guidance application may identify a difference of the plurality of differences corresponding to the attendee. For example, UserE may have an importance weight of 0.6 and an arrival time of 7:20 PM, and may therefore correspond to a difference of 20 minutes. For example, the weighted difference of UserE may be 0.6 (his or her importance weight) multiplied by 20 minutes (his or her difference between arrival time and the start time of the event), which results in a weighted difference of 12 minutes.

Step 820 of process 800 may continue to 820*c*, where the media guidance application computes (e.g., via control circuitry 404), using the plurality of weighted differences, a weighted average of the plurality of differences. For example, if the weights for UserA, UserB, UserC, UserD, and UserE were 0.1, 0.1, 0.1, 0.1, and 0.6, respectively, and the differences for these attendees were 25, 15, 5, 10, and 20 minutes, respectively, the weighted differences would be 2.5, 1.5, 0.5, 1.0, and 12 minutes, respectively. To compute the weighted average of the plurality of differences, the media guidance application may simply sum the plurality of weighted differences, to result in a weighted average of the plurality of differences equal to 17.5 minutes.

Step 820 of process 800 may continue to 820*d*, where the media guidance application assigns (e.g., via control circuitry 404) the weighted average to be the statistical representation. For example, the weighted average of the plurality of differences may be equal to 17.5 minutes. The media guidance application may then assign 17.5 minutes as the statistical representation.

Step 820 of process 800 may continue to 820*e*, where the media guidance application recalculates (e.g., via control circuitry 404) the delayed start time based on the statistical representation. For example, the recalculated delayed start time of the event may be the start time (e.g., 7:00:00 PM) added to the statistical representation (e.g., 17.5 minutes). For example, the start time of the event may be 7:00:00 PM, the delayed start time of the event may be 7:15:00 PM, and the recalculated delayed start time of the event may be 7:17:30 PM.

Figure 9:
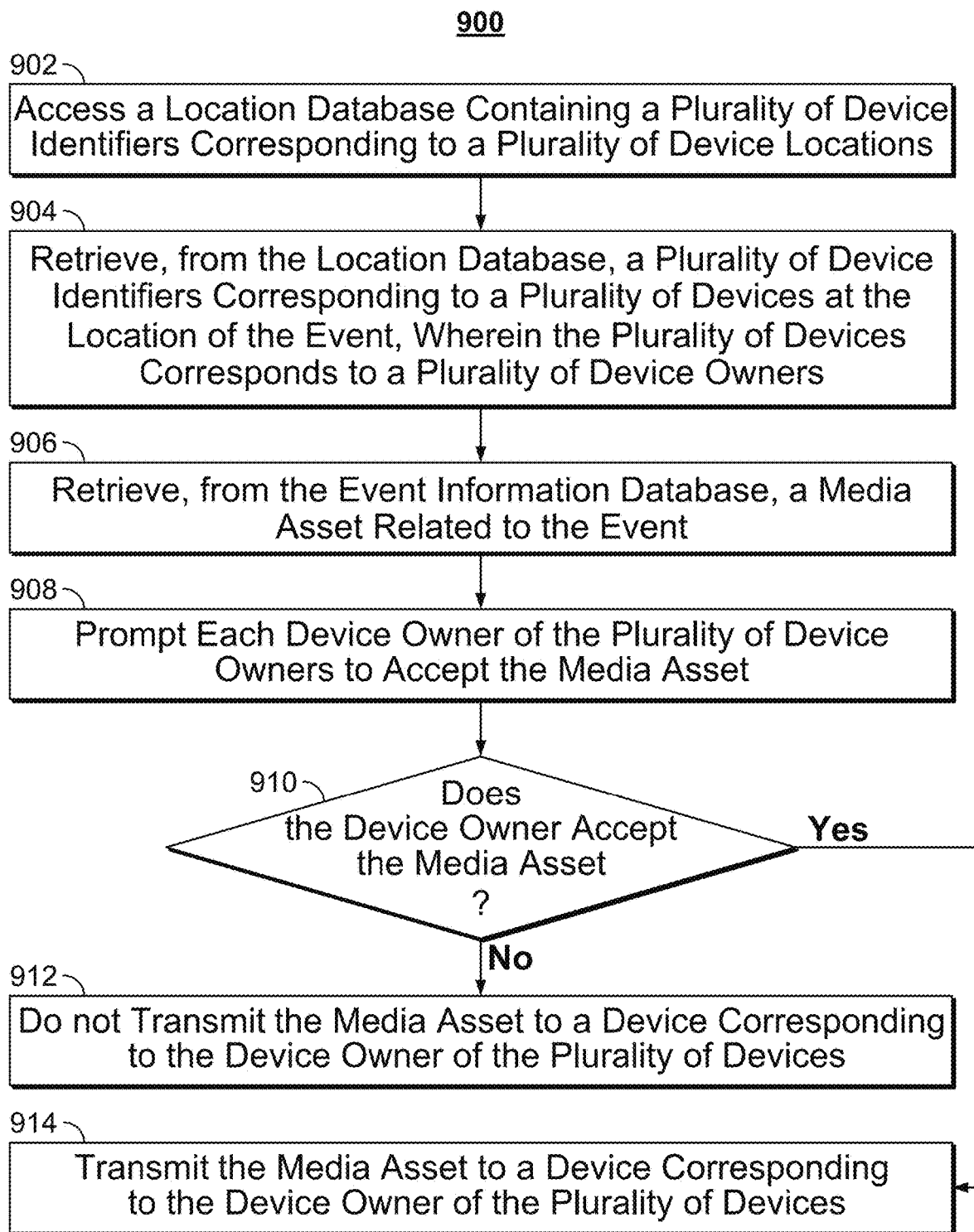
FIG. 9 is a flowchart of illustrative steps for providing event attendees with a media asset related to an event, in accordance with some embodiments of the disclosure.

FIG. 9 is a flowchart of illustrative steps for providing event attendees with a media asset related to an event, in accordance with some embodiments of the disclosure. For example, a media guidance application may instruct control circuitry 404 to execute the elements of process 900.

Process 900 begins at 902, where the media guidance application accesses (e.g., via control circuitry 404 over communications network 514) a location database containing a plurality of device identifiers corresponding to a plurality of device locations. For example, the media guidance application may access a global positioning system (GPS) database that contains device identifiers for every device near a certain location.

Process 900 continues to 904, where the media guidance application retrieves (e.g., via control circuitry 404 over communications network 514), from the location database, a plurality of device identifiers corresponding to a plurality of devices at the location of the event, wherein the plurality of devices corresponds to a plurality of device owners. For example, the media guidance application may access the GPS database and retrieve a list of user devices that are currently at the event location, such as AMC Theater 19, where "Guardians of the Galaxy" was scheduled to start at 7:00 PM. For example, UserC may have arrived at AMC Theater 19 before the delayed start time of 7:15 PM. UserC may be bored while waiting for the movie showing to begin and may wish to view a media asset related to "Guardians of the Galaxy."

Process 900 continues to 906, where the media guidance application retrieves (e.g., via control circuitry 404 over communications network 514) from the event information database, a media asset related to the event. For example, if the event is a movie showing of "Guardians of the Galaxy," the media guidance application may retrieve the movie trailer for "Guardians of the Galaxy" from the event information database.

Process 900 continues to 908, where the media guidance application prompts (e.g., via control circuitry 404 over communications network 514) each device owner of the plurality of device owners to accept the media asset. For example, the media guidance application may display a notification on the user devices (e.g., mobile devices) at the event that says "Would you like to view the movie trailer for 'Guardians of the Galaxy?'" and provides "yes" and "no" options that the users can click to indicate their acceptance ("yes") or rejection ("no") of the movie trailer. For example, UserC may view a notification displayed on his or her phone and select either "yes" to view the movie trailer or "no" to not watch the movie trailer.

Process 900 continues to 910, where the media guidance application determines (e.g., via control circuitry 404) whether the device owner accepts (e.g., by selecting "yes" in response to the prompt) the media asset. If the device owner does not accept, process 900 continues to 912, where the media guidance application does not transmit the media asset to a device corresponding to the device owner of the plurality of devices.

If the device owner does accept, process 900 continues to 914, where the media guidance application transmits (e.g., via control circuitry 404 over communications network 514) the media asset to a device corresponding to the device owner of the plurality of devices. For example, if UserC clicks the "yes" option, the "Guardians of the Galaxy" movie may be transmitted to UserC's mobile device, where UserC may then view the movie trailer.

FIG. 10 is a flowchart of illustrative steps for delaying the start of an event based on the arrival times of event attendees, in accordance with some embodiments of the disclosure. For example, a media guidance application may instruct control circuitry 404 to execute the elements of process 1000.

Process 1000 begins at 1002, where the media guidance application determines (e.g., via control circuitry 404 over communications network 514) a start time of an event, a location of the event, and a plurality of attendees of the event. For example, the media guidance application may access an event information database hosted by a movie theater company, such as the movie theater company AMC Theaters, or from a third-party database that aggregates event information. The media guidance application may retrieve a data structure from the event information database, the data structure containing a start time of the event, a location of the event, and a plurality of attendee identifiers corresponding to a plurality of attendees of the event. For example, from the data structure, the media guidance application may determine that the event is a showing of a movie called "Guardians of the Galaxy" at 7:00 PM EST at AMC Theater 19 located at 175 Tremont Street, Boston, Mass. The data structure may contain a plurality of attendee identifiers corresponding to a plurality of attendees of the event, such as a list of names of people who have bought tickets to see "Guardians of the Galaxy" at 7:00 PM EST at AMC Theater 19. For example, UserA, UserB, UserC, UserD, and UserE may have bought tickets online for the movie showing.

Process 1000 continues to 1004, where the media guidance application determines (e.g., via control circuitry 404) a plurality of location applications, wherein each attendee of the plurality of attendees corresponds to a respective location application of the plurality of location applications. For example, the media guidance application may search a location application database using a list of the attendees who have bought tickets to the movie showing. The media guidance application may determine, for example, that a first attendee, UserA, corresponds to location application GPS_A, while a second attendee, UserB, corresponds to GPS_B.

Process 1000 continues to 1006, where the media guidance application queries (e.g., via control circuitry 404) the plurality of location applications for a plurality of arrival times, each arrival time of the plurality of arrival times corresponding to a respective attendee of the plurality of attendees. For example, the media guidance application may query GPS_A for an arrival time for UserA at AMC Theater 19. GPS_A may return, to the media guidance application, an arrival time of 7:25 PM for UserA.

Process 1000 continues to 1008, where the media guidance application calculates (e.g., via control circuitry 404) a plurality of differences between each of the plurality of arrival times and the start time of the event. For example, UserA may have an arrival time of 7:25 PM but the start time of the event may be 7:00 PM. In this case, a difference (associated with UserA) of the plurality of differences would be 25 minutes.

Process 1000 continues to 1010, where the media guidance application delays (e.g., via control circuitry 404), based on the plurality of differences, the start time of the event. For example, the media guidance application may calculate a statistical representation of the plurality of differences, compare the statistical representation to a threshold, determine whether the statistical representation exceeds the threshold, and, in response to determining that the statistical representation exceeds the threshold, delay the start time of the event by an amount that is based on the statistical representation of the plurality of differences (as described in relation to FIG. 6).

What is claimed is:

1. A method comprising:
   retrieving, via a communications network and from a user device, user schedule information related to a user selected movie scheduled to be shown at a movie theater;
   retrieving, via the communications network and from a media asset information database, movie schedule information related to a movie scheduled to be shown at the movie theater that matches the user selected movie;
   retrieving, via the communications network, current location information of the user device;
   retrieving, via the communications network, location information of the movie theater;
   determining, based on a comparison of the retrieved user schedule information, the retrieved movie schedule information, the retrieved current location information of the user device, and the retrieved location information of the movie theater that the user device will arrive late to the movie theater; and
   in response to the determining that the user device will arrive late to the movie theater:
      identifying a portion of the movie that will be missed; and
      transmitting the portion of the movie to the user device for display on the user device.

2. The method of claim 1, wherein retrieving the location information of the user device comprises:
   accessing, via the communications network, a global positioning system (GPS) database containing a user device identifier corresponding to a location of the user device.

3. The method of claim 1, wherein identifying the portion of the movie comprises:
   retrieving, over the communications network, from the media asset information database, the portion of the movie.

4. The method of claim 1, wherein the movie theater includes a projector device for presenting the movie to a plurality of users associated with a plurality of user devices.

5. The method of claim 1, wherein determining that the user device is in the vicinity of the movie theater comprises:
   determining that the user device is within a predetermined range from the movie theater.

6. A method comprising:
   retrieving, via a user device, user schedule information related to a user selected movie scheduled to be shown at a movie theater;
   retrieving, from a media asset information database, movie schedule information related to a movie scheduled to be shown at the movie theater that matches the user selected movie;
   accessing, by the user device, current location information of the user device;
   retrieving, via the communications network, location information of the movie theater;
   determining, based on a comparison of the retrieved user schedule information, the retrieved movie schedule information, the accessed current location information of the user device, and the retrieved location information of the movie theater that the user device will arrive late to the movie theater; and
   in response to the determining that the user device will arrive late to the movie theater:
      causing a server to transmit a movie trailer to the user device for display on the user device.

7. A system comprising:
   control circuitry configured to:
      retrieve, via a communications network and from a user device, user schedule information related to a user selected movie scheduled to be shown at a movie theater;
      retrieve, via the communications network and from a media asset information database, movie schedule information related to a movie scheduled to be shown at the movie theater that matches the user selected movie;
      retrieve, via the communications network, current location information of the user device;
      retrieve, via the communications network, location information of the movie theater;
      determine, based on a comparison of the retrieved user schedule information, the retrieved movie schedule information, the retrieved current location information of the user device, and the retrieved location information of the movie theater that the user device will arrive late to the movie theater; and
      in response to the determining that the user device will arrive late to the movie theater:
         identify a portion of the movie that will be missed; and
   communications circuitry configured to:
      transmit the portion of the movie to the user device for display on the user device.

8. The system of claim 7, wherein the control circuitry, when retrieving the location information of the user device, is configured to:
   access, via the communications network, a global positioning system (GPS) database containing a user device identifier corresponding to a location of the user device.

9. The system of claim 7, wherein the control circuitry, when identifying the portion of the movie, is configured to:
   retrieve, over the communications network, from the media asset information database, the portion of the movie.

10. The system of claim 7, wherein the movie theater includes a projector device for presenting the movie to a plurality of users associated with a plurality of user devices.

11. The system of claim 7, wherein the control circuitry, when determining that the user device is in the vicinity of the movie theater, is configured to:
    determine that the user device is within a predetermined range from the movie theater.

* * * * *